US008233716B2

(12) United States Patent
Kletter

(10) Patent No.: US 8,233,716 B2
(45) Date of Patent: Jul. 31, 2012

(54) SYSTEM AND METHOD FOR FINDING STABLE KEYPOINTS IN A PICTURE IMAGE USING LOCALIZED SCALE SPACE PROPERTIES

(75) Inventor: Doron Kletter, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1069 days.

(21) Appl. No.: 12/147,867

(22) Filed: Jun. 27, 2008

(65) Prior Publication Data

US 2009/0324087 A1 Dec. 31, 2009

(51) Int. Cl.
*G06K 9/46* (2006.01)

(52) U.S. Cl. ........................ 382/195; 382/190

(58) Field of Classification Search .................. 382/190, 382/124, 125, 115, 100, 217, 218, 305
See application file for complete search history.

(56) References Cited

U.S. PATENT DOCUMENTS

| 5,465,303 | A | 11/1995 | Levison et al. |
| 5,491,760 | A | 2/1996 | Withgott et al. |
| 5,613,014 | A | 3/1997 | Eshera et al. |
| 5,850,476 | A | 12/1998 | Chen et al. |
| 6,041,133 | A | 3/2000 | Califano et al. |
| 7,359,532 | B2 | 4/2008 | Acharya et al. |
| 7,844,594 | B1 | 11/2010 | Holt et al. |
| 2006/0104484 | A1 | 5/2006 | Bolle et al. |
| 2006/0285772 | A1 | 12/2006 | Hull et al. |
| 2008/0219560 | A1 | 9/2008 | Morimoto et al. |
| 2008/0317278 | A1 | 12/2008 | Lefebvre et al. |
| 2009/0176566 | A1 | 7/2009 | Kelly |
| 2009/0324026 | A1 | 12/2009 | Kletter |
| 2009/0324100 | A1 | 12/2009 | Kletter et al. |

FOREIGN PATENT DOCUMENTS

EP 1850270 A1 10/2007

OTHER PUBLICATIONS

Lowe: "Distinctive image features from scale-invariant keypoints", Int. J. of Computer Vision, 2004.*
Matthew Brown and David G. Lowe, "Invariant Features from Interest Point Groups." In British Machine Vision Conference, BMVC 2002, Cardiff, Wales, pp. 656-665 (here typed as 253-262), Sep. 2002.
Chris Harris and Mike Stephens, "A Combined Corner and Edge Detector." Proceedings of the Alvey Vision Conference, pp. 147-151, 1988.

(Continued)

*Primary Examiner* — Matthew Bella
*Assistant Examiner* — Ruiping Li
(74) *Attorney, Agent, or Firm* — Fay Sharpe LLP

(57) ABSTRACT

A method and system is provided for finding stable keypoints in a picture image using localized scale properties. An integral image of an input image is calculated. Then a scale space pyramid layer representation of the input image is constructed at mulitple scales, wherein at each scale, a set of specific filters are applied to the input image to produce an approximation of at least a portion of the input image. Outputs from filters are combined together to form a single function of scale and space. Stable keypoint locations are identified in each scale at pixel locations at which the single function attains a local peak value. The stable keypoint locations which have been identified are then stored in a memory storage.

23 Claims, 21 Drawing Sheets

OTHER PUBLICATIONS

Timor Kadir, Andrew Zisserman and Michael Brady, "An Affine Invariant Salient Region Detector." Computer Vision—ECCV 2 004, pp. 228-241.

Yan Ke and Rahul Sukthankar, "PCA-SIFT: A More Distinctive Representation for Local Image Descriptors." In Conference on Computer Vision and Pattern Recognition, pp. 111-119, 2000.

Luke Ledwich and Stephan Williams, "Reduced SIFT Features for Image Retrieval and Indoor Localization." IEEE Transaction on Pattern Analysis and Machine Intelligence, vol. 19, No. 5. May 1997.

Vincent Lepetit and Pascal Fua, " Randomized Trees for Keypoint Recognition." Proceedings IEEE Computer Society Conference on Computer Vision and Pattern Recognition CVPR05, vol. 2, pp. 775-781, 2005.

Vincent Lepetit and Pascal Fua, "Towards Regognizing Feature Points using Classification Trees." Technical Report IC/2004/74 EPFL, 2004.

Vincent Lepetit, Julien Pilet and Pascal Fua, "Point Matching as a Classification Problem for Fast and Robust Object Pose Estimation." In Conference on Computer Vision, pp. 128-142, Copenhagen, 2002.

David G. Lowe, "Distinctive Image Features from Scale-Invariant Keypoints." International Journal of Computer Vision, vol. 60, No. 2, pp. 91-110, 2004.

Krystian Mikolajczyk,and Cordelia Shcmid "An Affine Invariant Interest Point Detector." In European Conference on Computer Vision and Pattern Recognition, vol. 1, pp. 128-142, 2002.

Krystian Mikolajczyk,and Cordelia Shcmid "A performance Evaluation of Local Descriptors." In Conference on Computer Vision and Pattern Recognition, pp. 257-263, Jun. 2003, (paper shows a draft date of Feb. 23, 2005).

Julien Pilet, Vincent Lepetit and Pascal Fua, "Fast Non-Rigid Surface Detection, Registration and Realistic Augmentation." International Journal of Computer Vision, Springer 2007.

Cordelia Shcmid and Roger Mohr, "Local Greyvalue Invariants for Image Retrieval." IEEE Transaction on Pattern Analysis and Machine Intelligence, vol. 19, No. 5, May 1997.

Lindeberg,T, "Feature Detection with Automatic Scale Selection." International Journal of Computer Vision, vol. 30, No. 2, pp. 79-116, 1998.

Viola, P., and Jones, M., "Rapid object detection using a boosted cascade of simple features." In Proceedings of Computer Vision and Pattern Recognition CVPR, vol. I, pp. 511-518, 2001.

L. M. J. Florack, Bart M. Ter Haar Romeny, J.J Koenderink and M. A. Viergever, "General intensity transformations and differential invariants," In Journal of Mathematical Imaging and Vision. vol. 4, No. 2, pp. 171-187. May 1994.

A. Baumberg, "Reliable Features Matching across Widely Separated Views" In Conference on Computer Vision and Pattern Recognition, vol. 1, pp. 774-781, 2000.

F. Schaffalitzky and A. Zisserman, "Multi-View Matching for Unordered Image Sets or How do I Organize My Holiday Snaps" In European Conference on Computer Vision, vol. 1, pp. 414-431, 2002.

W. T. Freeman and E. H. Adelson, "The Design and Use of Steerable Filters" Transactions on Pattern Analysis and Machine Intelligence, vol. 13, pp. 891-906, 1991.

G. Carneiro and A. Jepson, "Multi-Scale Phase-based Local Features" In Conference on Computer Vision and Pattern Recognition, vol. 1, pp. 736-743, 2003.

Lepetit, et al., "Keypoint recognition using randomized trees", IEEE-PAMI, vol. 28, No. 9, pp. 1465-1479, Sep. 2006.

European Search Report, EP Appl. No. 09163533.4-2218 / 2138978, Mailed Feb. 7, 2012, Completed Jan. 30, 3012, Munich, DE.

* cited by examiner

SYSTEM AND METHOD FOR FINDING STABLE KEYPOINTS IN A PICTURE IMAGE USING LOCALIZED SCALE SPACE PROPERTIES

BACKGROUND

The present application is directed a computer operable system and method which incorporates a software program and algorithm for identifying stable keypoints in an image. the identified stable keypoints may be used in a variety of applications, including finding a target image in a large collection of images based on a query image, in motion detection, image matching, object recognition, tracking, image mosaic, panorama stitching, 3D modeling, and surface mapping, among others.

A wide variety of image keypoint detectors have been proposed in the literature. One in particular is described in an article by C. Harris and M. Stephens, entitled "A Combined Corner and Edge Detector", *Proceedings of the Alvey Vision Conference*, pp. 147-151, 1988, and is known in the art as a Harris corner detector. This type of detector is based on a scale-adapted second moment matrix, otherwise known as autocorrelation. The matrix describes the gradient distribution in a local neighborhood of a point. The local derivatives are computed with Gaussian kernels of varying size, and then smoothed by another Gaussian window, i.e., the integration scale. The eigenvalues of the autocorrelation matrix represent the two principal curvatures in the neighborhood of a point. Keypoints are selected when both curvatures are high, which represents corners or junctions in two-dimensions (2D). However, it is well known the Harris corner detector is not scale invariant.

There are a few approaches that are generally invariant to scale changes. Lindeberg in "Feature Detection with Automatic Scale Selection," *International Journal of Computer Vision*, Vol. 30, No. 2, pp. 79-116, 1998, proposes to search in a three-dimensional (3D) scale-space representation using a pyramid of Gaussian filters such as Laplacian of Gaussian and other derivatives, and detect a feature point when the local 3D peak absolute value exceeds a certain threshold. The scale-space representation is built by successive smoothing of the high resolution image with Gaussian kernels of different size. The Laplacian of Gaussian is circularly symmetric and detects blob-like structures.

K. Mikolajczyk and C. Schmid in the articles "An Affine Invariant Interest Point Detector," in European Conference on Computer Vision and Pattern Recognition, Vol. 1, pp. 128-142, 2002, and "A Performance Evaluation of Local Descriptors," in Conference on Computer Vision and Pattern Recognition, pp. 257-263, June 2003, proposed robust scale-invariant detectors based on the Harris-Laplace and Hessian-Laplace operators. They used the determinant of the Hessian matrix to select the location and the Laplacian to select the scale.

One method called Scalable Invariant Feature Transform (SIFT) is described by D. G. Lowe in "Distinctive Image Features from Scale-Invariant Keypoints," International Journal of Computer Vision, Vol. 60, No. 2, pp. 91-110, 2004, and Matthew Brown and D. G. Lowe in "Invariant Features from Interest Point Groups," in British Machine Vision Conference, BMVC 2002, Cardiff, Wales, pp. 656-665, September 2002. In an effort to improve the speed, SIFT further approximates the Laplacian of Gaussian (LoG) by a Difference of Gaussian (DoG) image pyramid. The input image is successively smoothed with a Gaussian kernel and down-sampled. The Difference of Gaussian is obtained by subtracting two successive smoothed images. Thus all the DoG levels are constructed by combined smoothing and sub-sampling. The local 3D maxima in the image pyramid representation of spatial dimensions and scale determine the localization and scale of a keypoint.

Ke and Sukthankar, in "PCA-SIFT: A More Distinctive Representation for Local Image Descriptors," in Conference on Computer Vision and Pattern Recognition, pp. 111-119, 2000, proposed a Principal Components Analysis-Scalable Invariant Feature Transform (PCA-SIFT) that uses the SIFT keypoint detector in conjunction with Principal Component Analysis (PCA) to reduce feature dimensionality. Ledwich and Williams, in "Reduced SIFT Features for Image Retrieval and Indoor Localization," IEEE Transaction on Pattern Analysis and Machine Intelligence, Vol. 19, No. 5, May 1997, proposed a reduced SIFT feature set for mobile robot applications where rotation invariance is not necessary.

A common problem of SIFT and the other DoG and/or LoG-based approaches is that the local maxima are often detected in the neighborhood of contours or straight edges, where the signal only changes in one direction while the other direction is relatively flat. Keypoints from such neighborhoods are not stable because their localization is more sensitive to noise and/or small changes in nearby texture. A more sophisticated approach to solve this problem is the search for simultaneous maximum of both the trace as well as the determinant of the Hessian matrix. The addition of the Hessian determinant penalizes points for which the second derivative changes in one direction only. However, the need to calculate both the determinant and trace of the Hessian matrix greatly increases the computational complexity of this solution.

A particular issue with regard to keypoint detectors is the degree of robustness to noise and variations in rotation, scale and other common image degradations at which the keypoint detector is required to operate.

The existing methods above such as SIFT and PCA-SIFT require a considerable amount of computations which limit the overall performance. The present application discloses a system and method that offers performance improvement over the existing techniques and is just as effective in identifying the best keypoints in an image.

BRIEF DESCRIPTION

A method and system is provided for finding stable keypoints in a picture image using localized scale space properties. An integral image of an input image is calculated. Then a scale space pyramid layer representation of the input image is constructed at multiple scales, wherein at each scale, a set of specific filters are applied to the input image to produce an approximation of at least a portion of the input image. Outputs from filters are combined together to form a single function of scale and space. Stable keypoint locations are identified in each scale at pixel locations at which the single function attains a local peak value. The stable keypoint locations which have been identified are then stored in a memory storage.

INCORPORATION BY REFERENCE

The disclosures of U.S. patent application No. Ser. No. 12/147,624 for "Method And System For Finding A Document Image In A Document Collection Using Localized Two-Dimensional Visual Fingerprints", by Doron Kletter et al., filed [Unknown]; and U.S. patent application Ser. No. 12/163,186 for "System and Method For Finding A Picture Image In An Image Collection Using Localized Two-Dimensional Visual Fingerprints", by Doron Kletter, are each hereby incorporated herein in their entireties.

BRIEF DESCRIPTION OF THE DRAWINGS

FIGS. 2C and 2D illustrate application of a stable keypoint identification operation, wherein FIG. 2C represents a printed-version of a camera image, whose defined keypoints are shown in FIG. 2D.

FIGS. 2E and 2F illustrate a further example of application of a stable keypoint operation according to the concepts of the present system and method, wherein FIG. 2E represents a target image and FIG. 2F represents the target image keypoints;

FIG. 13A-13E are illustrations of the keypoint identification process using the scale space approach, wherein FIG. 13A is an input image, FIG. 13B is an output of a horizontal filter, FIG. 13C is an output of a vertical filter, FIG. 13D is an output of a diagonal filter, and FIG. 13E is an output of a combination of the horizontal, vertical and diagonal filters;

DETAILED DESCRIPTION

Figure 1:
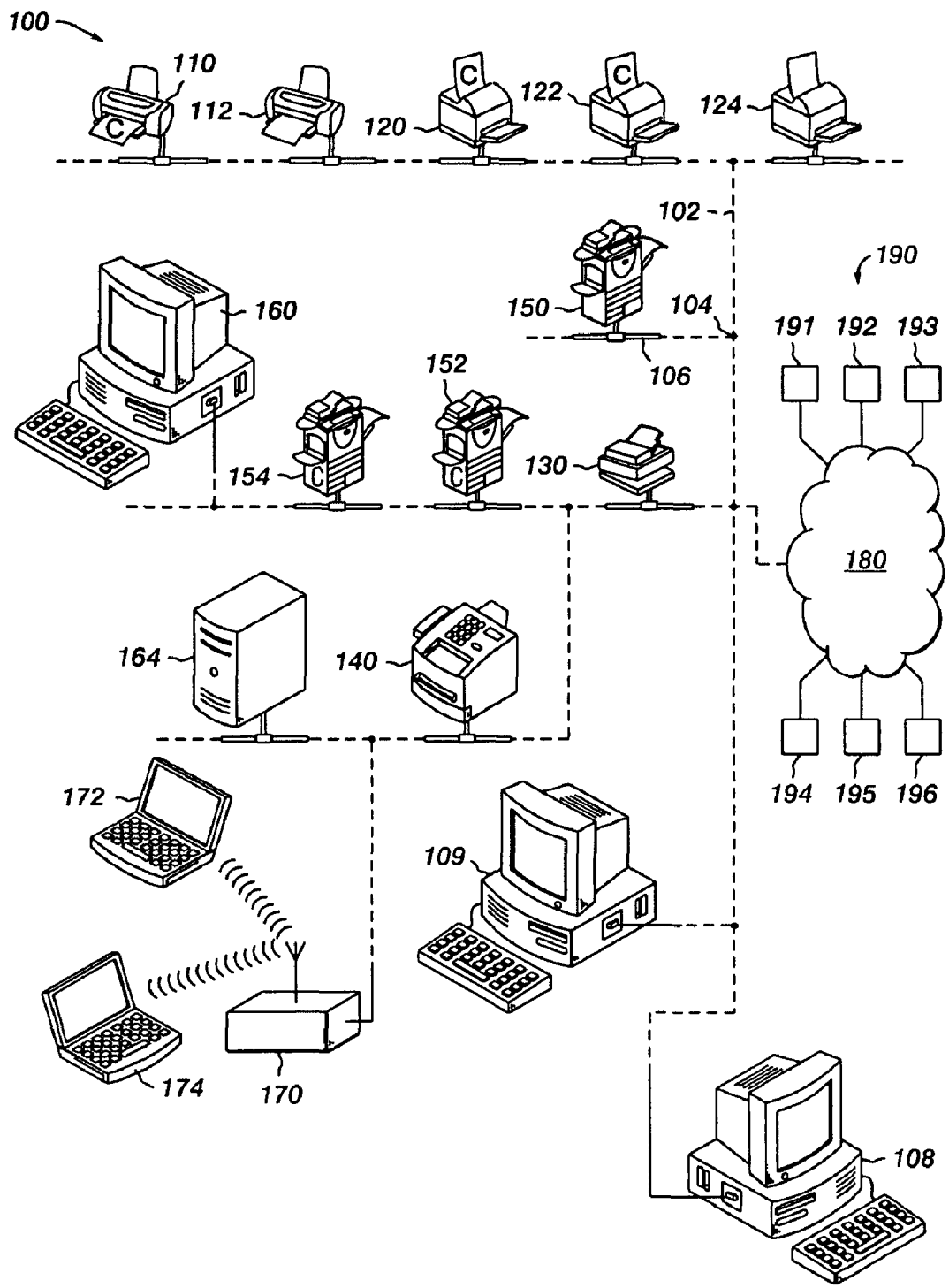
FIG. 1 sets out an environment in which the concepts of the present application may be implemented.

The system and method as described herein may work within the parameters of a computer network as illustrated in FIG. 1. The computer network 100 may be comprised of a series of wires 102, many of which may branch or join with a third wire 106 at a wire junctions 104, may connect a standalone peripheral device or pass through a peripheral to connect to other devices, such as computers 108, 109, wherein a computer may be considered a peripheral device. The network may incorporate a color printer 110 or other than color printer 112 as well as at least a color laser printer 120, 122 or one other than color laser printer 124. The network may also incorporate a scanner 130, or a fax machine 140, a photocopier 150, a color photocopier 152, or a combination color printer/scanner/fax machine 154. The network may also contain a personal computer and/or standalone computer terminal 160, or a standalone hard drive data storage medium 164. The network may also contain a wireless network transmitter receiver 170 and interface with at least one laptop computer 172, or a plurality of laptop computers 174. The network may also interconnect with any form of network 180 including but not limited to the Internet, an Intranet or other communication network. Through use of an interface with another form of network, the present system and method may interface with a plurality of peripheral data capturing devices 190 including, but not limited to a digital still camera 191, a digital video camera 192, a cellular telephone 193, a scanner 194, a personal data assistant 195, or a document indexing system 196. It is to be understood the present concepts may be implemented in networks having various combinations of the above components, going from a network having a single device to one which includes thousands or more connected devices. Further, various ones of the above components may have memory storage areas arranged in any of a number of known configurations which may be useful in implementing the concepts to be described. The storage areas may be RAM, ROM, Flash Memory or other memory types which can hold software incorporating the concepts of the present application. Other memory storage areas may be configured to hold various digital images in any of a number of database formats.

Still further various ones of the components of FIG. 1, such as but not limited to the computers, include processors to process instructions from software loaded on or otherwise accessible by the components. It is to be understood various ones of the components having the processors may have more than one processor whereby processing of the instructions can be divided among the multiple processors. Alternatively, a single processor can operate to divide the instructions, whereby processing can occur in a multi-threaded environment.

Figure 2A:
FIGS. 2A and 2B represent application of a stable keypoint identification operation using a system and method according to the present application for a screen-displayed query camera image shown in FIG. 2A, and the keypoint identified locations of the screen-displayed query camera image shown in FIG. 2B, wherein the corresponding keypoint locations are detected in three scales, with the smallest-scale locations marked with "+", intermediate-scale locations with "□", and largest scale locations with "○".
Figure 2B:
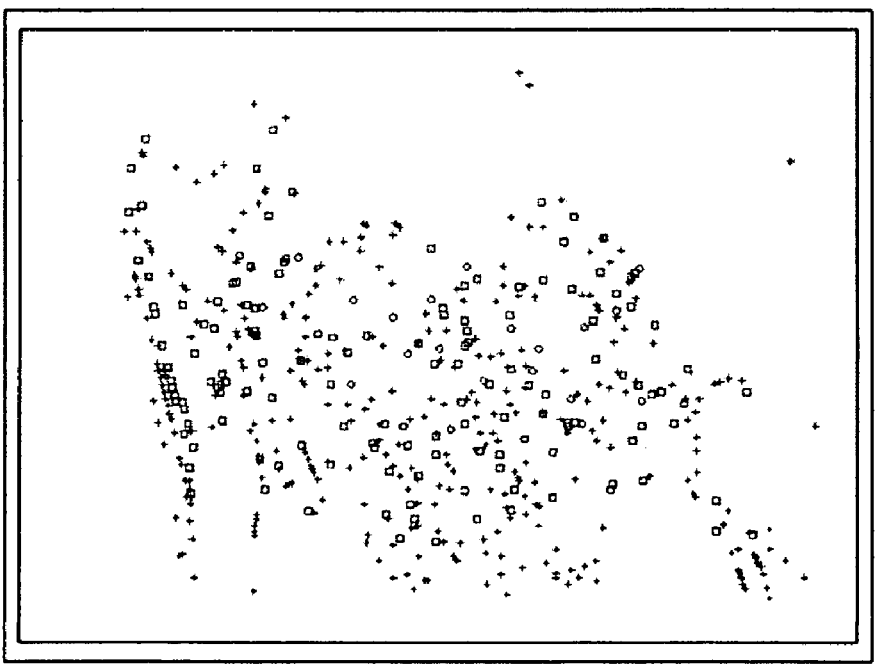
Figure 2C:
Figure 2D:
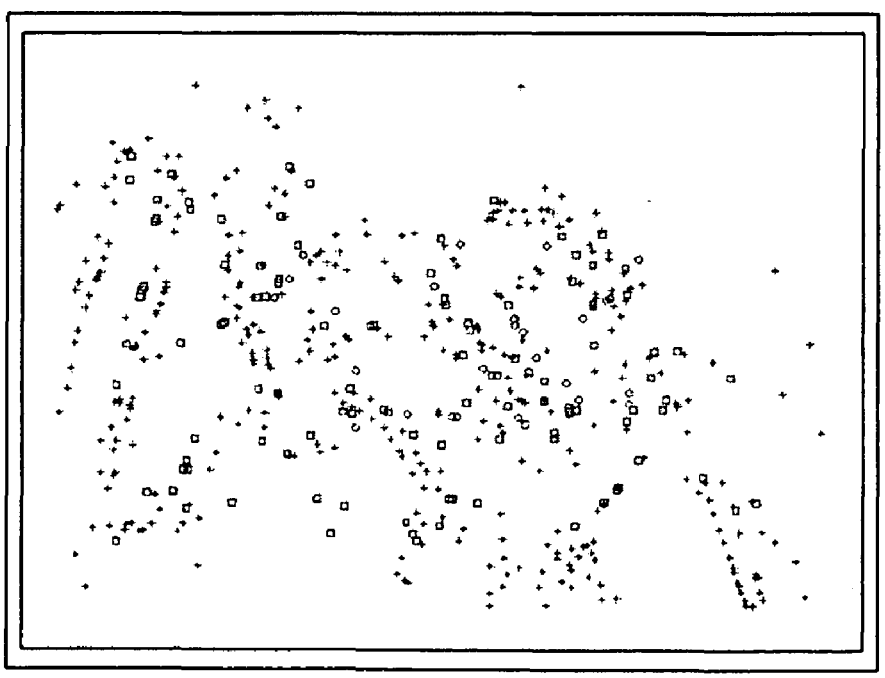
Figure 2E:
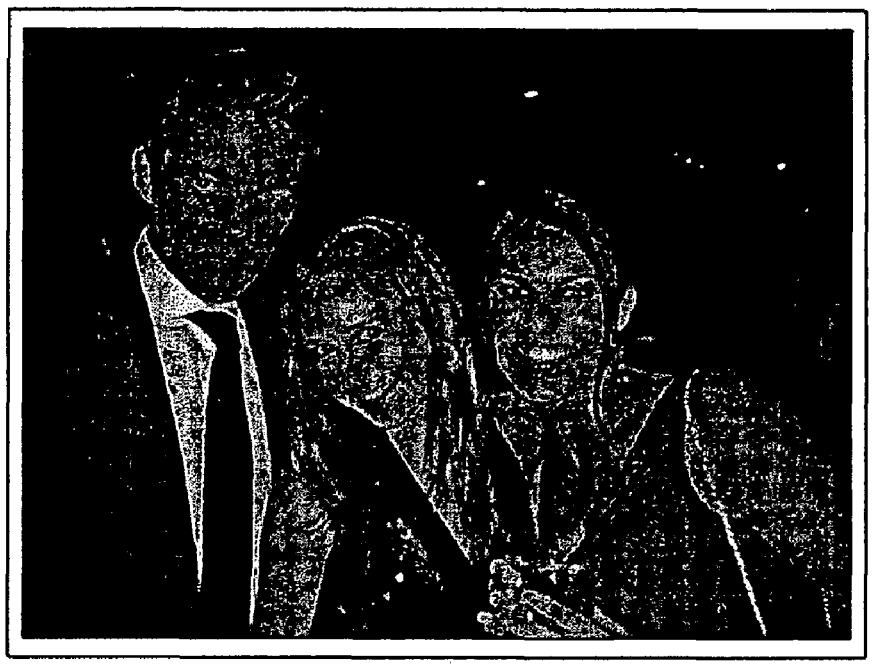

Turning now to FIGS. 2A-2F, illustrated are examples of successful applications of stable keypoint identifications using the system and method of the present application. Particularly, FIG. 2A illustrates a screen-displayed camera image where the camera image is a degraded query image which is used in an attempt to identify a target image, such as the image of FIG. 2E, which may be in a database of a large plurality of images. Similarly, the image of FIG. 2C is another example of a printed-version query camera image, also degraded (e.g., having an obstruction over part of the image) from the target image shown in FIG. 2E. Keypoint locations obtained by operation of the system and method of the present application to the images of FIGS. 2A, 2C and 2E are, respectively illustrated in FIGS. 2B, 2D and 2F. The obtained keypoint locations in three scales are shown with the smallest-scale locations marked with a "x", intermediate-scale locations with "☐", and largest-scale locations with "○". Where smallest-scale locations are identified by use of smallest sized filters, the intermediate-scale locations are identified by use of an intermediate-size, scaled-up version of the smallest sized filters, and largest-scale locations are identified by use of largest sized filters, which are scaled-up version of the intermediate sized filters. Therefore, FIGS. 2A-2F illustrate the results of the operation of the system and method of the present application, which will now be disclosed in more detail below.

Figure 2F:

As can be seen, many of the keypoints of FIG. 2F, which corresponds to the target image of FIG. 2E, are also found in FIGS. 2B and 2D, which correspond to the degraded images of FIGS. 2A and 2C, respectively, despite the considerable difference in image quality, resolution, and varying illumination between the images.

An overview of the system and method of the present application includes the following concepts:

(a) Calculate an integral image of an input image in order to be able to quickly compute an output of a rectangular filter shape of any size on the input image in just a few additions regardless of the filter size.

(b) Construct a scale space pyramid layer representation of the input image at multiple scales. At each scale, a set of specific filters is applied to the input image to produce an approximation of at least a portion of the input image. In one embodiment, the approximation may be in the form of a Laplacian of Gaussian (LoG) function. Each successive filter is a scaled up version of the previous filter. The output of the filters is combined together to form a single function $D(x,y,s)$ of scale and space.

(c) Stable keypoint locations are identified in each scale as the pixel locations at which the function $D(x,y,s)$ attains a local peak value (either a maximum or a minimum) in the scale space neighborhood.

Employing the above steps result in a procedure faster at computing than existing methods including SIFT, yet appears to be just as effective in identifying stable keypoints in an image.

In order to detect keypoints even at small scales, the SIFT method of D. Lowe in "Distinctive Image Features From Scale-Invariant Keypoint", *International Journal of Computer Vision*, Vol. 60, No. 2, pp. 91-110, 2004, recommends interpolation of the input image to double the number of pixels in each dimension before building the scale space pyramid. According to Lowe, the doubling of the input image may increase the resulting number of keypoints at a cost of additional performance slow down due to having four times the number of pixels to process. However, in past experience with typical camera images, it was observed that such additional keypoints at small scales are generally weak and not likely to be reliably found in a noisy version of the image. Therefore, the present embodiments do not advocate the upfront interpolation of the input image as proposed by SIFT.

Details of the system and method of the present application are provided below.

I.1 The Integral Image

Figure 3:
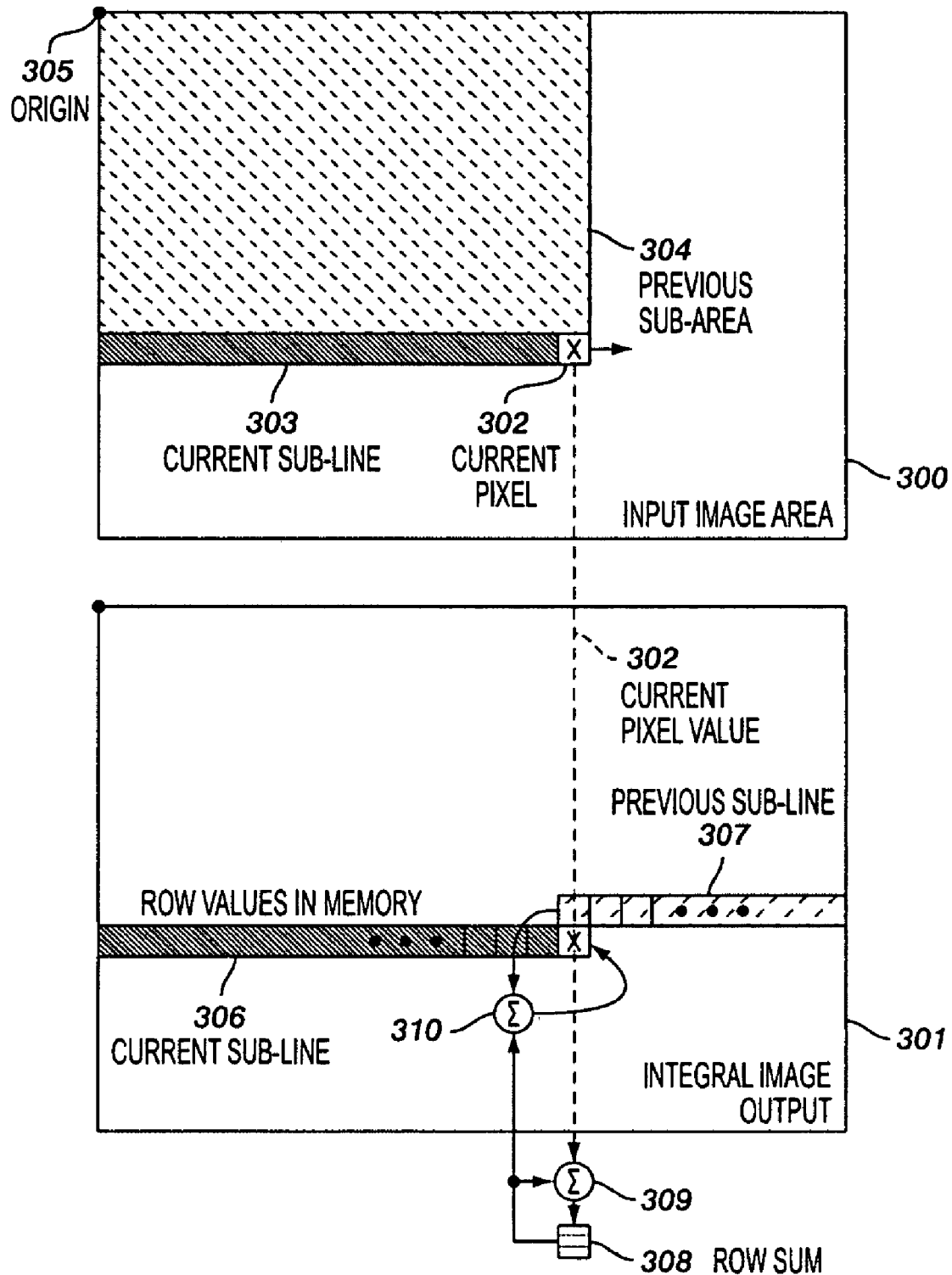
FIG. 3 is an illustration of an efficient method for calculating the integral image.

The integral image was introduced by Viola and Jones in "Rapid Object Detection Using a Boosted Cascade of Simple Features", in *Proceedings of Computer Vision and Pattern Recognition CVPR*, Vol. I, pp. 511-518, 2001. An efficient way to calculate the integral image is illustrated in FIG. 3. The input image to be processed is shown in the top part 300 of FIG. 3, while the corresponding integral image output is shown in the bottom part 301 of FIG. 3.

The value of the integral image at the current pixel 302 is defined as the sum of all the pixel values in the rectangular area containing the origin point 305 upper-left corner of 300 and up to and including the current pixel position 302 as bottom-right corner. An aspect of the efficiency is to leverage previously calculated results to the extent possible. The input image is commonly processed in raster scan order, one line at a time, and within a line, say, from left to right, one pixel at a time.

As can be seen, the value of the integral image at an arbitrary current pixel position 302 can be constructed by summing together the following two quantities: (1) The previous sub-area 304, which has already been computed as the integral image value at a pixel location exactly one line behind the current pixel position; and (2), the sum of pixel values on the current sub-line 303 starting from the first pixel on the current line and up to and including the current pixel value 302.

Note that the integral image is based on the sum of pixel values in a rectangular area. The method here assumes that the input image is obtained in a common raster scan order. However, the roles of rows and columns can easily be reversed if the image is obtained in column order instead of the usual raster scan row order.

An efficient way to calculate the integral image is by using a line array 306 and 307 to hold the previous integral image results for exactly one image line. The total number of elements in the line array is exactly the same as the number of pixels in a single line of the input image. This array is being used as a circular buffer for temporary storage.

The line array pixel values 306 from the beginning of the line to the current pixel position 302 contain previously processed and updated integral image values for the pixels on the current line. These values are being stored for subsequent processing of the next image line. At the same time, the line array pixel values 307 from the current pixel position 302 forward to the end of the line array contain previous integral image values on previous line that have not yet been updated. At each current pixel position 302, the previous line integral image value is read from the current array pixel position 306, applied to calculate the current integral image value, and the updated result is then written back to the line array 307 overwriting the previous value at this location. The process then advances to the next pixel on the current line. This read-modify-write cycle continues for each pixel location until the end of a line is reached.

At each pixel location, the current pixel value 302 is first added to the previous row sum 308 using the adder 309 as shown on the bottom of FIG. 3. The row sum is an internal register used for accumulating the running sum of pixel values from the beginning of the current line up to the current pixel position 302. The row sum register is reset to zero at the beginning of each line. The output of the adder 309 is written back to the row sum register to update its value at each pixel position. The updated row sum value is equivalent to the sum of the current sub-line 303 and the current pixel value 302.

The updated row sum value 308 is next added using the second adder 310 to the previous line integral image value 307 at exactly one line behind, since the content has not yet been updated the current pixel position 302. The adder 310 output is the resulting integral image value at the current pixel position 302. The result is written back to the line array at the current pixel location 302, in order to hold its value for subsequent processing of the next line. Thus each line array element undergoes a single read-modify-write cycle, one pixel at a time, while thereby simultaneously providing a continuous one-line running buffer window the line array to temporarily hold the integral image values for subsequent reuse on the following lines.

Using the proposed method above, the calculation of the entire integral image requires only two additions per pixel. The entire operation can of course be pipelined using two separate adders operating in parallel to reduce the integral image calculation to a single dual add addition per pixel. Thus the integral image is fast to compute, and it only needs to be calculated once for a given image. After the integral image has been computed, the result can be repeatedly and efficiently used to drastically accelerate the calculation of various rectangular filter shapes in the manner described below. Unlike the traditional approach of cascaded filtering, the integral image provides the capability to calculate the output of any rectangular filter area in a fixed constant time independent of the area size.

I.2 Constructing Individual Scale Space Layers

The traditional approach for building a scale space representation is by means of an image pyramid. A drawback of the existing methods is that the image pyramid is usually constructed by repeatedly applying a Gaussian filter and subsequently down sampling the input image in order to obtain a higher pyramid level, corresponding to a higher scale. The image pyramid construction process in accordance with existing methods can be illustrated as following: The input image may first be interpolated to double the image dimensions in each direction, for example as in the SIFT method. Next, a Gaussian filter of zero mean and variance a is applied to the increased-size image to produce an output image which is the first, smallest-scale, pyramid layer. The resulting first image layer is then down-sampled by a factor of 2, and a second Gaussian filter of zero mean and equivalent variance of $\sqrt{2}\sigma$ is applied to produce the second image pyramid layer at the second, one higher, scale. Each subsequent layer is in turn produced by down-sampling the previous pyramid layer output and effectively applying an increasingly larger Gaussian filter to the resulting image to produce the next pyramid layer. Thus the entire process of building the image pyramid is of sequential nature, with each subsequent space-scale pyramid layer being entirely dependent on all previous pyramid layers of smaller scale, and therefore cannot be computed at the same time as all other layers. Furthermore, a general non-separable square Gaussian filter of size N pixels in each direction requires order $O(N^2)$ multiplications and additions to calculate, where O is the number of operations. The number of operations is proportional to the filter area size, and thus each subsequent layer takes longer to compute relative to a previous layer due to the increased filter size, again making it necessary to store subsequent layer result in memory to make them simultaneously available at a later stage for keypoint extraction. The number of filter operations can be reduced to an order of $O(N)$ multiplications and $O(2N)$ additions if the filter is separable, but still takes a considerable time to compute for several scales.

In addition, because of the need to recursively filter and down-sample, the entire process is of a serial nature, and the calculation of higher order levels cannot be obtained at the same time for all pyramid levels. However, the keypoint identification process depends on simultaneous availability of a certain number of levels (at least 3 to 4 typically). Thus the intermediate pyramid levels must be stored in memory for later use.

Instead of repeatedly filtering and down-sampling the input image to create a multiple-scale image pyramid as in existing approaches, the present system and method uses a different approach that is based on direct identification of localizable properties of the input image in the horizontal, vertical, and diagonal directions. The various filter outputs are combined together to identify localizable "blob-like" and "junction-like" features in the input image.

Further, instead of iteratively applying a Gaussian filter to the (increasingly smaller) output of a previously filtered and down-sampled version of the input image, as in previous methods, the system and method of the present application up-samples the filter and applies the larger filter version directly on the original input image. Thus at each higher scale the previous filter shape can be doubled in size, for example, while the input image remains constant.

On the surface, this seemingly benign change of scaling perspective appears to be counter intuitive. However, it has been found in the present system and method that replacing a fixed filter and sequentially shrinking image size with a fixed image and sequentially growing filter size can results in an improvement in performance.

An advantage of this approach is that the larger filters can be directly applied to the original input image, without having to be cascaded iteratively, as in existing methods, using the previous filter output. In addition, it takes exactly the same amount of time to process a filter of any size due to the use of integral image and the particular filter shapes. Thus all the filters can be computed at exactly the same speed independent of their size. Furthermore, each rectangular filter region requires only a few additions to calculate using the integral image, regardless of its size.

In result, the proposed system and method obtains a performance improvement relative to the existing traditional iterative approach, yet is just as effective in identifying the location of robust scale-invariant keypoints in an image.

Figure 4A:
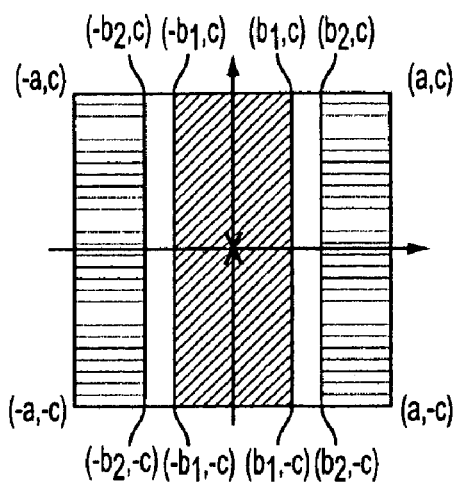
FIGS. 4A-4C are illustrations of the three basic filter types used for constructing individual scale space layers, including, respectively, a horizontal filter, a vertical filter, and a diagonal filter.
Figure 4B:
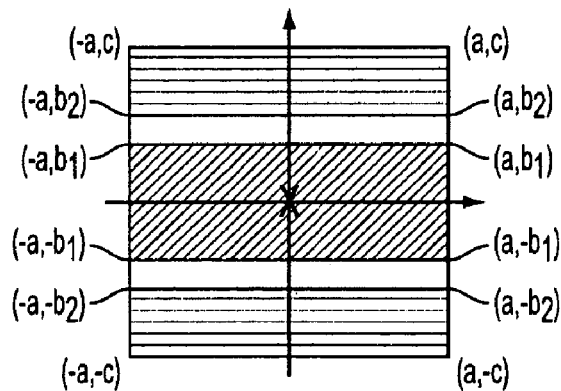
Figure 4C:
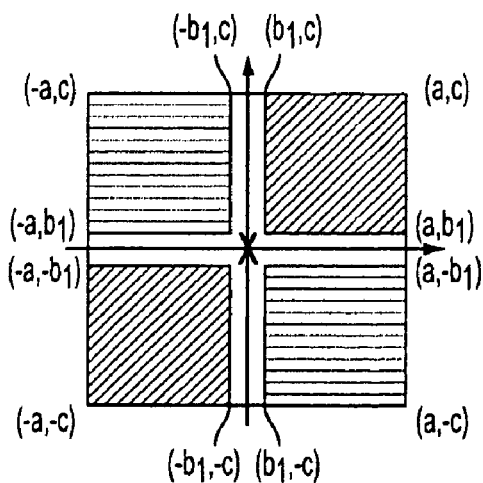

FIGS. 4A-4C illustrate three basic filter types used to construct the individual layers of the scale space pyramid in accordance with the present application.

At each scale, three separate filters are applied to the input image: (a) horizontal filter of FIG. 4A, (b) vertical filter of FIG. 4B, and (c) diagonal filter of FIG. 4C. The center position of each filter marked with 'X' is the current pixel position in an input image around which the filter window is positioned.

The size of each filter is proportional to the scale at which it is applied. Note that each filter is composed of a set of rectangular areas since the intent is to apply the integral image for fast calculation. Note also that the vertical filter in FIG. 4B is a 90-degree rotated version of the horizontal filter shape in FIG. 4A.

The horizontal filter shape of FIG. 4A is comprised of a central region (shown with a diagonal line pattern) in which all the pixel values assume a given polarity, say +p, and two outer regions (shown with a horizontal line pattern) in which all the pixel values assume an opposite polarity, say −m, where "p" and "m" are two non-zero integer values.

The sense of the polarity assignment between the two region types whether the central region is positive and the outer regions negative, or the other way round is arbitrary as long it is consistently applied.

An optional "guard band" shown as white regions in FIG. 4A is introduced along the boundaries between opposing region types in order to separate the regions apart from each other. The purpose of this "guard band" is to improve the filter stability and minimize the sensitivity to noise by leaving out noisy pixels along the region boundaries that may fluctuate in polarity. All pixel values inside a "guard band" region are assigned the value of zero.

Thus the value of each filter pixel assumes one of three possible values {−m, 0, +p}. The values of "p" and "m", in one embodiment integer values, are selected to provide an unbiased filter output for the case of a constant input image based on the relative region area sizes. For example, in the case of the horizontal or vertical filter, choosing a pair of "p" and "m" values to satisfy the equation:

$$p/m = b_1/(c-b_2).$$

It is possible to find a pair of "p" and "m" since $b_1$, $b_2$ and c are all integer pixel number values.

The shape of each filter is parameterized by means of a set of four parameter values $\{a, b_1, b_2, \text{and } c\}$. The values of these parameters are proportional to the scale. As the filter size is scaled up, all the parameter values increase proportionally, while keeping the filter shape proportionally normalized. Note also that the four parameter values $\{a, b_1, b_2, \text{and } c\}$ do not necessarily have to be the same for the diagonal filter as for the horizontal or vertical filter.

The horizontal filter is designed to detect candidate tall and narrow "elongated" features in the input image that are well localizable in the horizontal direction. The feature polarity such as, but not limited to the center region being darker or lighter relative to the outer region is ignored by using the magnitude of the filter output as shall be described below. The magnitude of the filter output is effectively proportional to the contrast difference between the center and outer filter regions for each current pixel position.

For example, the horizontal filter in FIG. 4A has, in general, a narrow and tall central region of width $2*b_1$ and height $2*c$ whereby $b_1 < c$. Likewise, it also has two outer regions of combined width $2*(a-b_2)$ and height $2*c$. An optional tall and narrow vertical "guard band" may be inserted between the central and outer regions, with a width of $(b_2-b_1)$ and height of $2*c$. Alternatively setting the parameter values $b_2=b_1$ allows the "guard band" to be entirely eliminated.

Likewise, the vertical filter of FIG. 4B is designed to detect candidate wide and short "elongated" features in the input image that are well localizable in the vertical direction. The shape of the vertical filter is a 90-degree rotated version of the horizontal filter in FIG. 4A.

Similarly, the diagonal filter of FIG. 4C is designed to detect candidate "elongated" features in the input image that are well localizable in the diagonal direction. The shape of the diagonal filter is composed of four rectangular regions, two of which (shown with a diagonal line pattern) are oriented in one diagonal direction while the other two (shown with a horizontal line pattern) are oriented in the opposite diagonal direction. Note that since all region sizes are identical in the case of the diagonal filter, the filter response is already unbiased by design and it is sufficient to assign the values of +1 or −1, instead of "p" and "m" above, to all the pixel values in each of these regions, depending on the region type, as indicated above.

Note that the diagonal filter also contains an optional "guard band" shown as a white region in FIG. 4C around its primary axis. The "guard band" region is introduced along the boundaries of opposing region types in order to improve the filter stability and immunity to noise. All pixel values inside a "guard band" region are assigned the value of zero. For a general case of a rectangular diagonal filter, the "guard band" has a width of $2*b_2$ around the horizontal axis and a width of $2*b_1$ around the vertical axis. The width of the "guard band" can be made symmetrical by choosing $b_1=b_2$, or eliminated altogether by choosing $b_1=b_2=0$. The total area of each region type, not including the "guard band" area, is $2*(a-b1)(c-b2)$ for the diagonal filter.

Figure 5A:
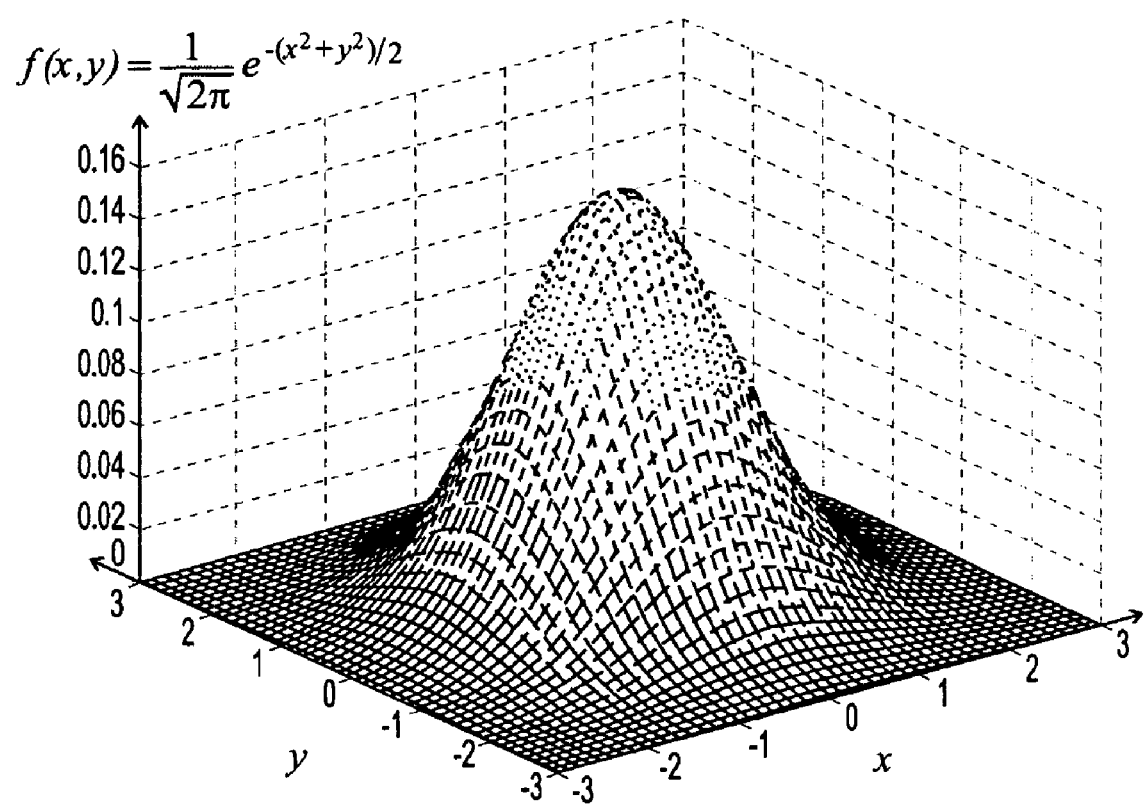
FIG. 5A illustrates a unit variance Gaussian function.

It can further be shown that with the proper selection of the parameter values $\{a, b_1, b_2, \text{and } c\}$, each one of the filters can be viewed as an approximation of a second partial derivative of a Gaussian kernel in the horizontal, vertical, and diagonal directions, respectively. More particularly, FIG. 5A illustrates a unit variance Gaussian filter function. This is the smoothing filter that is being applied to the input image in FIG. 2A at the smallest scale—except that it has a normalized variance of 1 instead of σ as in the more general case.

Figure 5B:
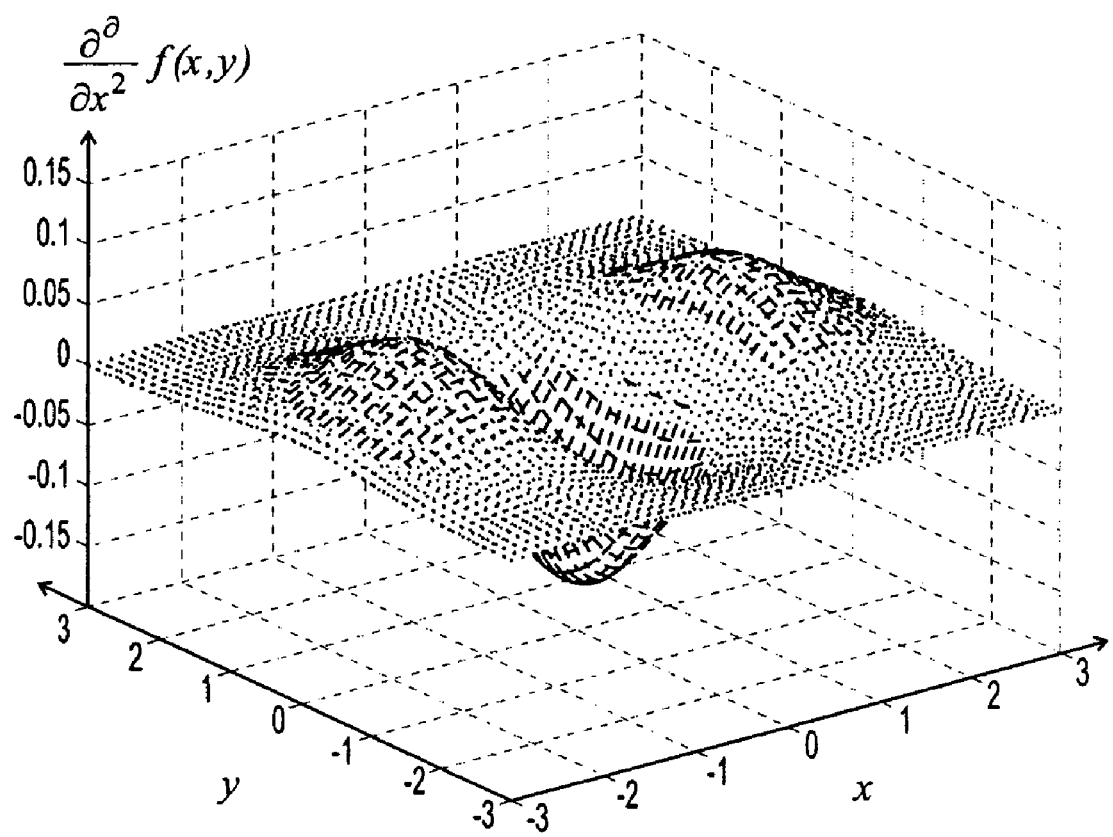
FIG. 5B is the unit variance Gaussian function partial second derivative with respect to horizontal axis X.
Figure 5C:
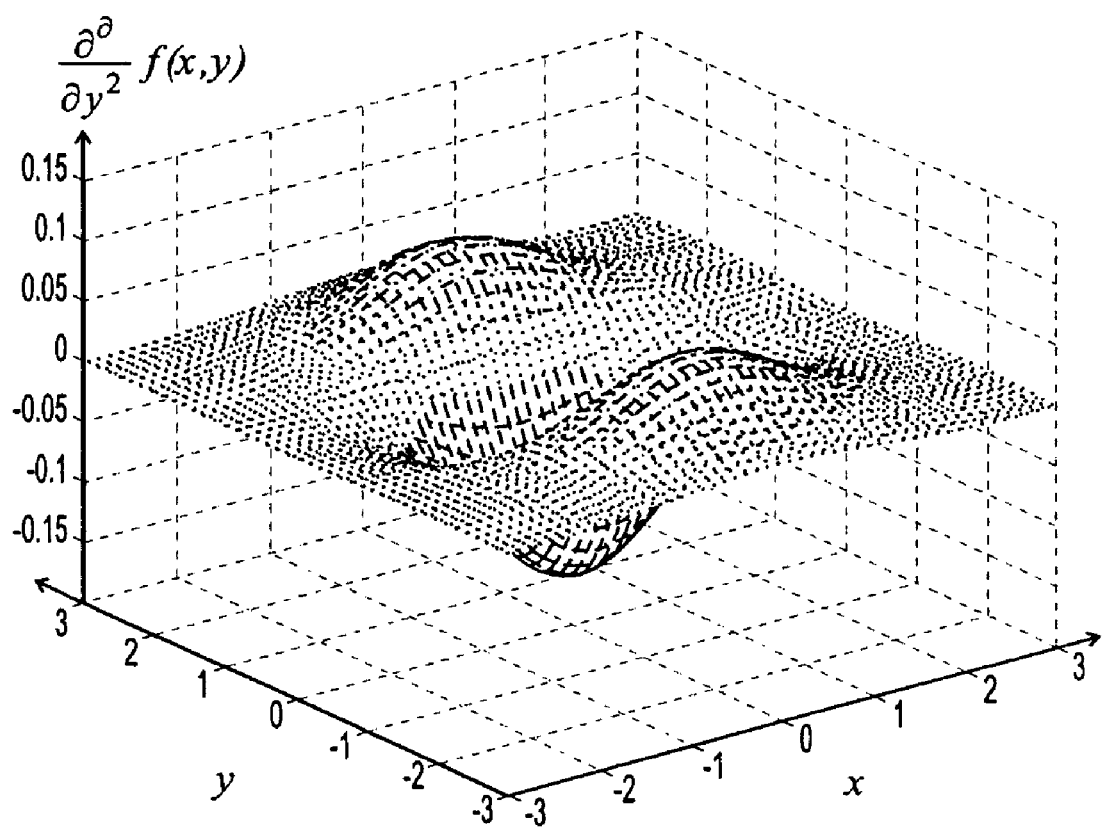
FIG. 5C is the unit variance Gaussian function partial second derivative with respect to vertical axis Y.
Figure 5D:
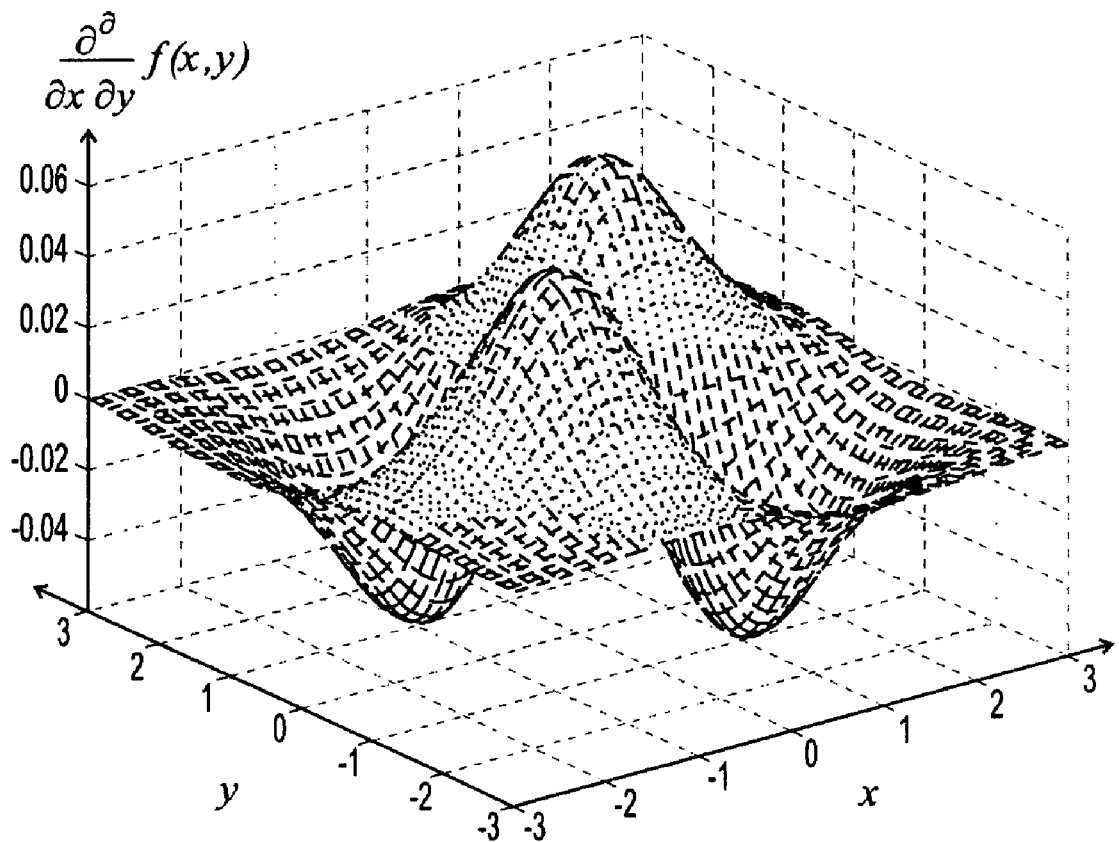
FIG. 5D is the unit variance Gaussian function partial second derivative with respect to the diagonal direction, with cascaded partial first derivatives in both X and Y.

The partial second derivatives, horizontal vertical and diagonal, of the unit variance Gaussian function are shown in FIGS. 5B, 5C, and 5D, respectively. The diagonal second derivative in this context is the product of the first partial horizontal derivative and first partial vertical derivative, i.e., [0001]. Thus it can be seen that the smoothing Gaussian second derivative functions are approximated with rectangular trinary (i.e., three) filter shapes in each case.

Since the present system and method does not utilize down sampling of the input image, the need for smoothing and pre-filtering is greatly reduced. Therefore, according to the present approach, each of the filters in FIGS. 4A-4C is an averaging filter over increasingly larger area sizes as the scale increases. However, some smoothing can be provided by slightly overlapping subsequent filter positions in order to provide increased robustness to noise and minimize any blocking artifacts. Using a quarter to one-half filter overlap scheme in each direction provides excellent results. This means that the next filter location at a given scale is advanced by a value between a/2 to a in the horizontal direction, thereby partially overlapping the previous filter location. Upon reaching the end of a line, the next filter location is also moved down by a value between c/2 to c in the vertical direction as well, leading to a partial vertical overlap with the previous filter locations as well.

Figure 6A:
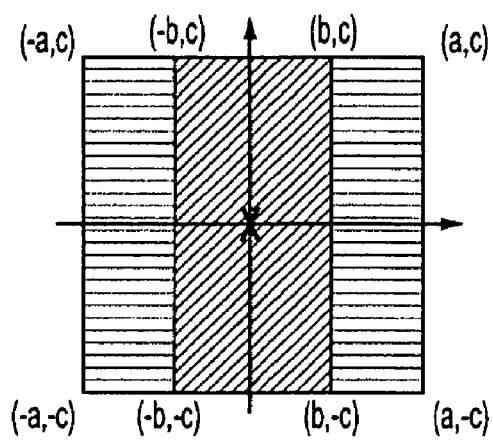
FIGS. 6A-6C are illustrations of three simplified versions of the filter types in FIGS. 4A-4C used for constructing the individual scale space, including, respectively, a horizontal filter, a vertical filter and a diagonal filter.
Figure 6B:
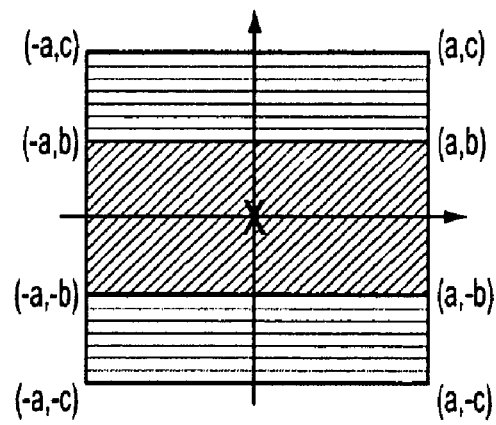
Figure 6C:
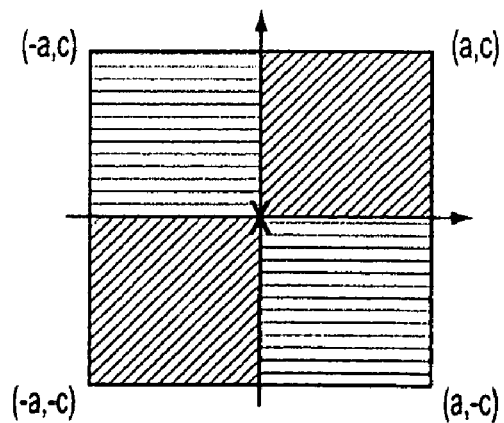

A first aspect of this approach is that due to the integral image rectangular filter shapes, it only takes a handful of additions to calculate a filter result. Each rectangular filter region requires only four additions to calculate using the integral image, regardless of its size. Additional savings can be made when adjacent region areas share a common boundary. For instance, it would normally require $3*4=12$ additions to calculate the horizontal filter in FIG. 4A, since it contains one center region and two outer regions. However, if there is no "guard band" region, the entire horizontal filter can be calculated in just eight clocks instead of twelve by extending the outer region over the entire filter area $[(-a, -c) \text{ to } (a, c)]$ and adjusting the values of "p" and "m" accordingly to nullify the addition of the extra outer area. The shapes of the simplified horizontal, vertical and diagonal filters without a "noise band" region are respectively illustrated in FIGS. 6A-6C. The simplified filter shapes in FIGS. 6A-6C are faster to compute than the original shapes in FIGS. 4A-4C, but not as robust to noise due to the lack of a "noise band" region. In noisy input image situations, it may be preferable to apply the original filter shapes in FIGS. 6A-6C instead of the simplified ones in FIGS. 4A-4C.

A second aspect of the present approach is that the amount of operations and time it takes to calculate a filter is a fixed constant that remains exactly the same regardless of the filter size. For example, if the horizontal filter in FIG. 4A is doubled in size, it would still take the same number of additions to calculate, because the larger filter shape would still consist of three rectangular regions with proportionally adjusted corner points. This is in contrast to the case of repeatedly using a Gaussian filter and down sampling the previous filter output, where each higher pyramid level requires additional computations, taking extra time on top of the previous level.

A third aspect of the present approach is the elimination of any sequential pyramid level processing. This is a direct outcome of the fact that the present system and method always applies exactly the same input image for each filter type at any scale level. There is no need to filter the input image at all, and therefore the sequential dependency of one pyramid level, through having to filter and down sample the output of the previous level in order to obtain the input for a subsequent level, upon the completion of all the previous pyramid levels is eliminated. Thus the computation of one pyramid level becomes entirely decoupled of all other pyramid levels.

A fourth aspect of the present application is that it is ideally suited for parallel processing and\or for running in a multi-threaded environment. This is because the present system and method chooses to scale the filters instead of an unknown input image. Since the filter shapes are all known in advance, the entire set of scaled filter shapes of all types, sizes, and scales can be generated in advance and then be applied to the input image in parallel, if multiple processors are available, or in separate threads. Due to the lack of any dependency between pyramid levels, the entire processing scheme of building the scale space pyramid can be executed in parallel.

A fifth aspect of the present application is the ease of balancing the computational load among multiple processors or threads. This is an outcome of the property that nearly all the filters when calculated in accordance with the method of the present application will take exactly the same time to calculate regardless of the filter size. Thus the task of building the scale space pyramid can be evenly divided among multiple processors or threads, with each taking roughly the same time to execute, such that at the end of the process the required number of pyramid levels is made available for subsequent keypoint identification without having to store the results in memory and\or have idling processors due to uneven computational load.

A sixth aspect of this approach is that for higher pyramid octaves with yet larger filters at higher scales, the distance between subsequent filter positions can also be proportionally increased in order to further reduce the computational load. For higher octaves, the corresponding "blob-like" and/or "junction-like" features, after combining together the various filter outputs, also became quite large, and one can therefore get away without having to precisely pinpoint their location with detailed sub-pixel accuracy. If so desired, however, an additional interpolation scheme may be introduced for the higher pyramid octaves since the resulting distance between subsequent filter positions may become large.

I.3 Building the Scale Space Pyramid

The traditional approach for identifying keypoint locations that are invariant to scale changes is to construct a continuous function of both scale and space known as the scale space and search for stable features across multiple scales.

As previously mentioned, one existing method to generate a scale space pyramid is found in the Scalable Invariant Feature Transform (SIFT) method. The SIFT method is based on the approximation of the Laplacian of Gaussian (LoG) method—originally proposed by Lindeberg in "Scale Space Theory: A Basic Tool for Analyzing Structures at Different Scales", *Journal of Applied Statistics*, Vol. 21, No. 2, pp. 224-270, 1994—with an alternative Difference of Gaussian (DoG) function.

Figure 7A:
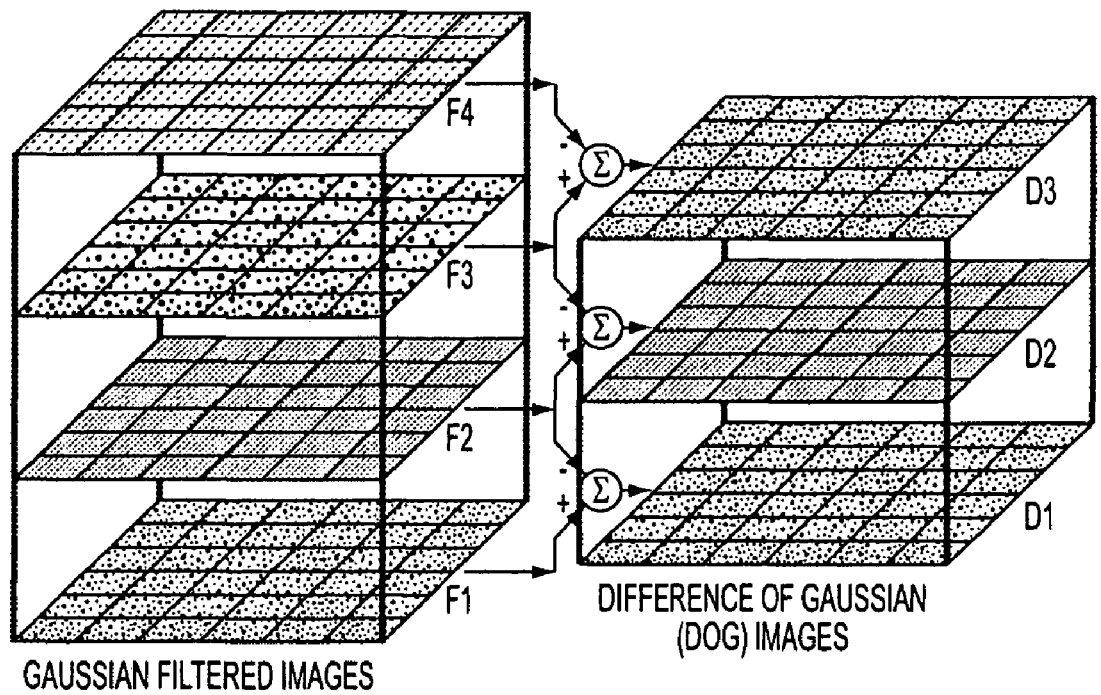
FIGS. 7A-7B are illustrations of the SIFT Difference of Gaussian (DoG) method for building a scale space pyramid.
Figure 7B:
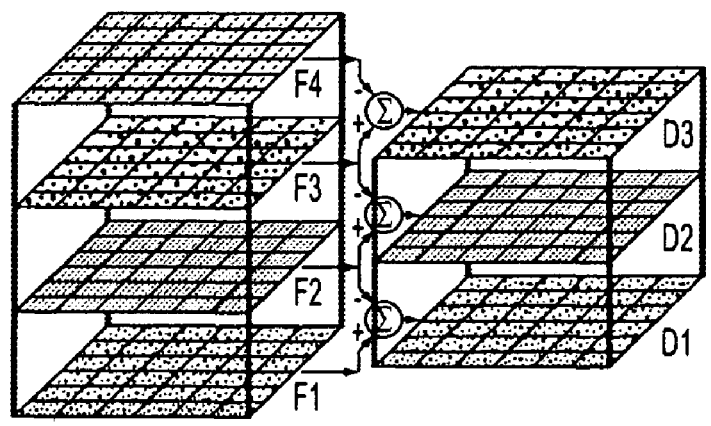
Figure 14:
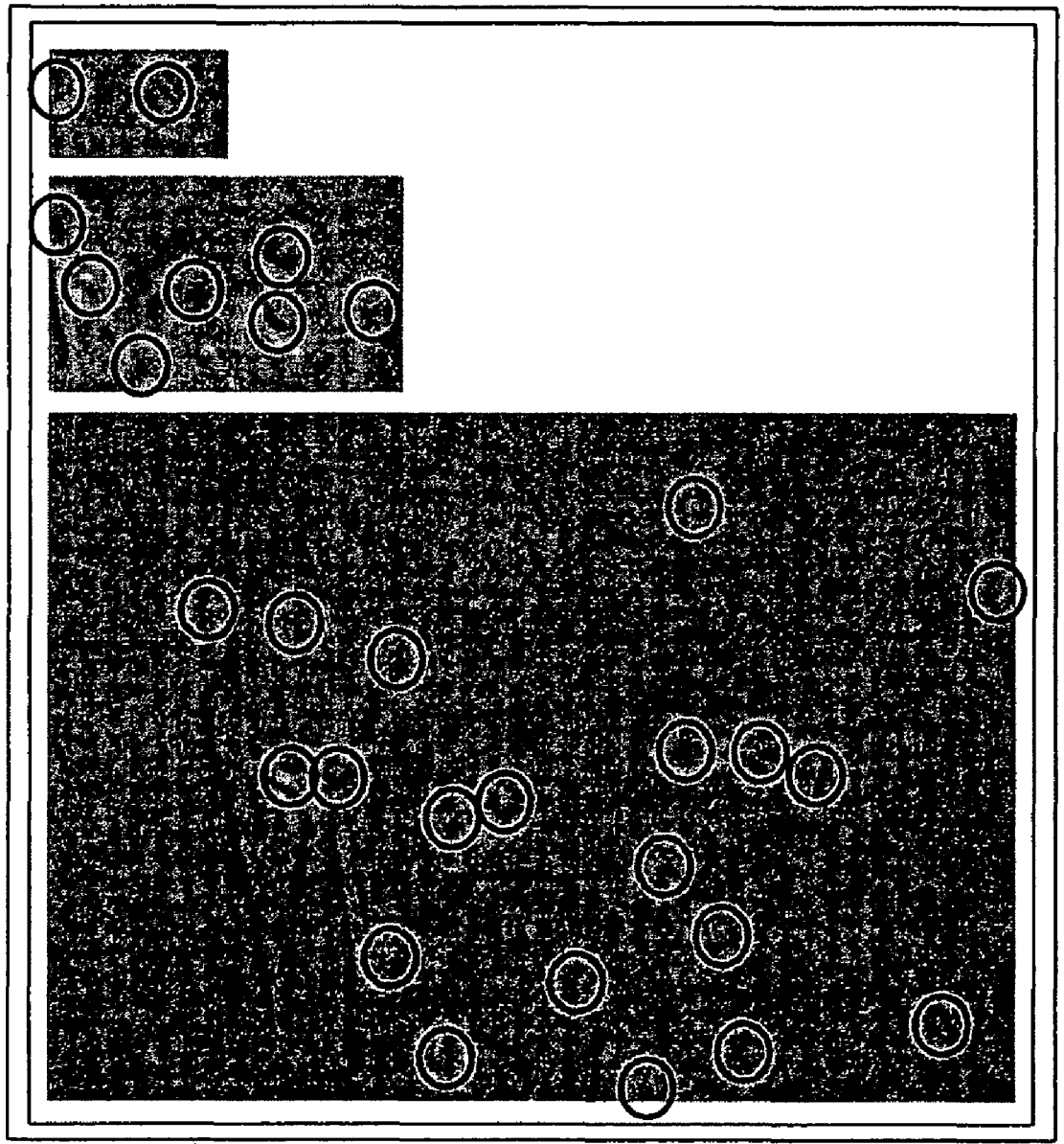
FIG. 14 is an illustration of the process of identifying stable keypoint locations from the scale space pyramid layers.
Figure 15:
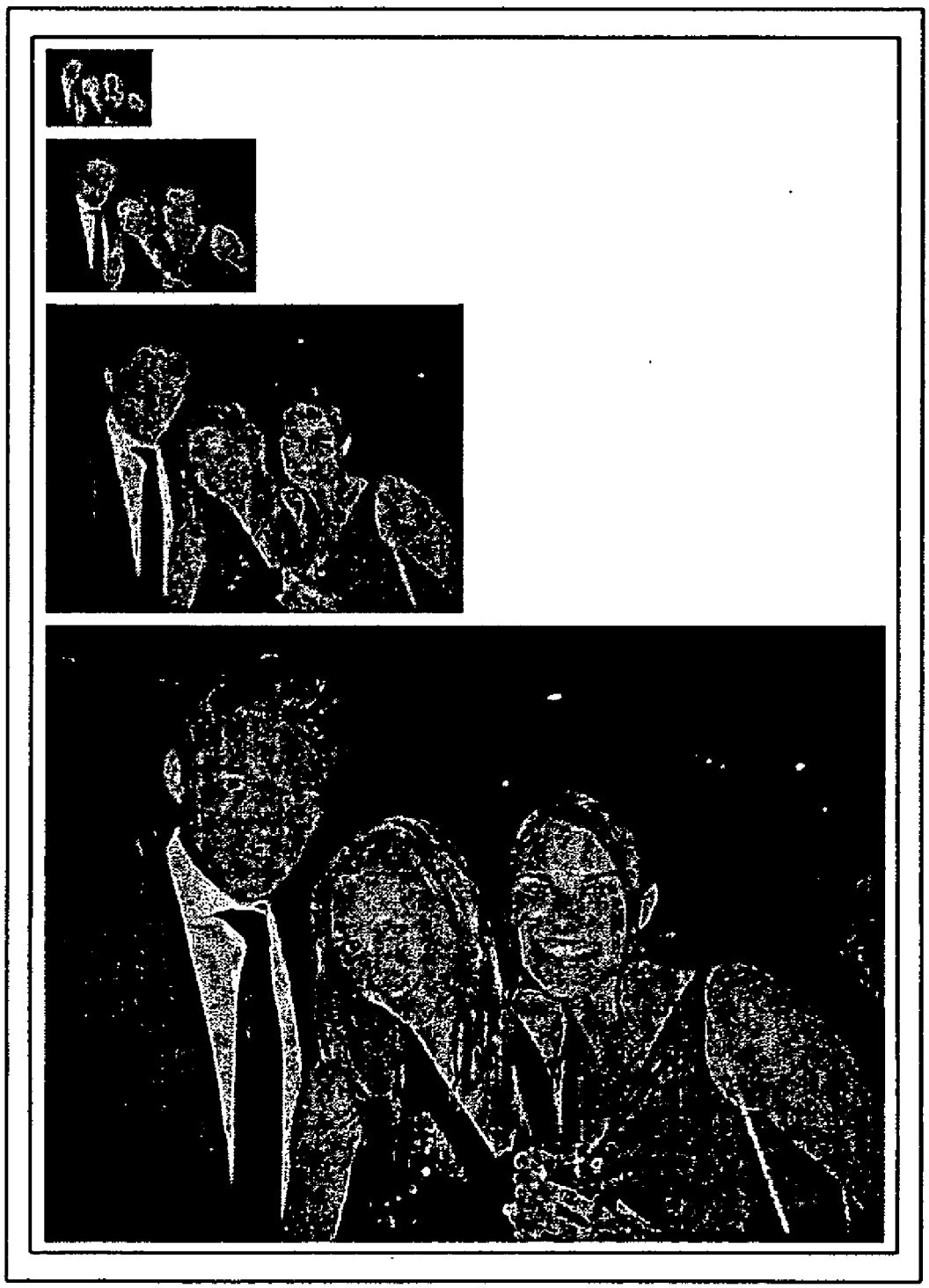
FIG. 15 is an illustration of a scale space image pyramid with the input image on the bottom of the figure.

The concepts of the SIFT method of building the scale space pyramid is shown in FIGS. 7A-7B. For each octave of the scale space (where FIG. 7A shows one scale and FIG. 7B shows a higher scale, after additional filtering and down-sampling), the initial input image is repeatedly convolved with a set of Gaussian filters to produce a set of scale space images shown on the left side of FIGS. 7A-7B. Adjacent Gaussian filtered images are subtracted to produce the difference-of-Gaussian D1-D3 images on the right side of FIGS. 7A-7B. After each octave, the Gaussian images from the previous octave are down sampled by a factor of 2 and the process is repeated. The concept of the iterative process of building the scale space pyramid is illustrated in FIG. 15. The Input image is shown on the bottom of FIG. 15, and above it are the cascaded results after three successive iterations of Gaussian filtering and down-sampling with a Gaussian filter of a particular scale. After subtraction of adjacent Gaussian images, the resulting difference-of-Gaussian D1-D3 images are shown in FIG. 14, with identified keypoints highlighted by circles.

The following discloses an advancement from the existing concepts, where the original Laplacian of Gaussian (LoG) function is replaced with a new approximation different than the (DoG) of the SIFT method that allows the opportunity to leverage the properties of the integral image as described above.

As has already been demonstrated in section I.2 above the filters in FIGS. 4A-4C provide a trinary approximation of the partial second derivative of the Gaussian function. The filter outputs can therefore be combined together to provide an approximation of the Laplacian of Gaussian (LoG), which in a way is also an approximation of the (DoG) as well. However, it should be noted that the present approach is different than SIFT, and is likely to lead to different results depending on the accuracy of the approximation.

Attention is now be directed to constructing a scale space difference pyramid in accordance with the present concepts.

Figure 8A:
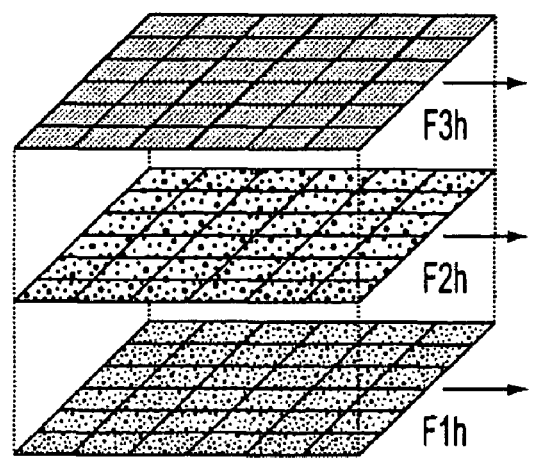
FIGS. 8A-8C are illustrations of a method of constructing the scale space pyramid showing, respectively, horizontal, vertical and diagonal filters.
Figure 8B:
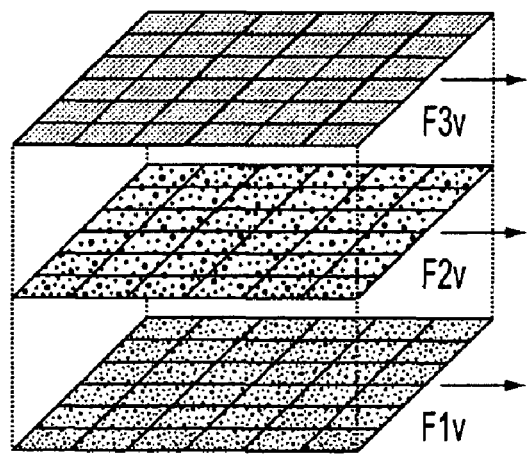
Figure 8C:
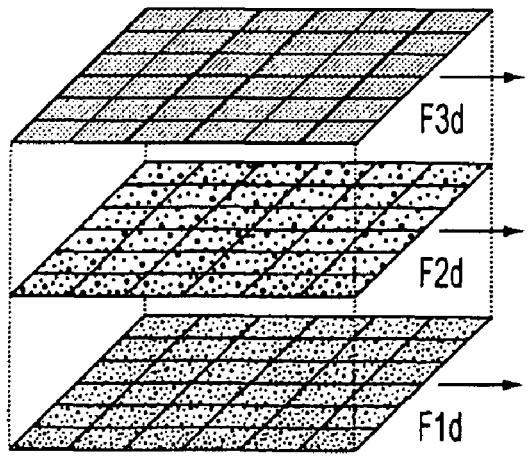

As shown in FIGS. 8A-8C, at least three scale space difference pyramid layers are needed to identify keypoint locations. This includes the current scale and at least one scale below and one scale above the current scale, in order to identify stable feature across neighboring scales. FIG. 8A represents horizontal filtering (e.g., F1$h$-F3$h$), FIG. 8B represents vertical filtering (e.g., F1$v$-F3$v$) and FIG. 8C represents diagonal filtering (e.g., F1$d$-F3$d$). As depicted in FIGS. 8A-8C, the input image is processed with a set of successively larger filters F1 through F3. Thereafter, the resulting outputs from the horizontal, vertical, and diagonal filter are combined together to form a single measure in which the keypoint locations are identified.

The filters F1 through F3 are efficiently calculated using the integral image in the manner described in the preceding section.

In one embodiment of this application an octave of the scale space is formed by using the minimal set of 3 filters as shown in FIGS. 8A-8C.

In another embodiment, additional increasingly larger filters are applied beyond F3 to extend the scale range. For example, an F4 filter (not shown) can be added in FIGS. 8A-8C, and its horizontal, vertical, and diagonal filter outputs will be combined together to form another measure layer for identifying keypoint locations. However, the maximum number of filters in an octave is limited by the image size, because it provides no benefit to look for features larger than the image size. Thus the largest filter size is determined by the image size.

When there are more than three different layers in an octave, the layers are processed in adjacent triples to ensure the feature stability across neighboring scales. That is, stable keypoint locations will first be identified based on the content of the first three layers {F1,F2,F3}, followed by stable keypoint locations from the subsequent set of three layers {F2, F3,F4}, with the new highest layer {F4} replacing the lowest layer {F1} and the layers {F2,F3} common to both sets. Likewise, the next set of three layers may include {F3,F4,F5} and so on. However, in most cases it is not usually necessary to use a larger number of layers beyond the first three since the filter sizes and scale of corresponding image features quickly becomes limited by the original image size, unless the image is larger than 1 to 2 mega-pixels in size, in which case it may be beneficial to add more layers.

Figure 9:
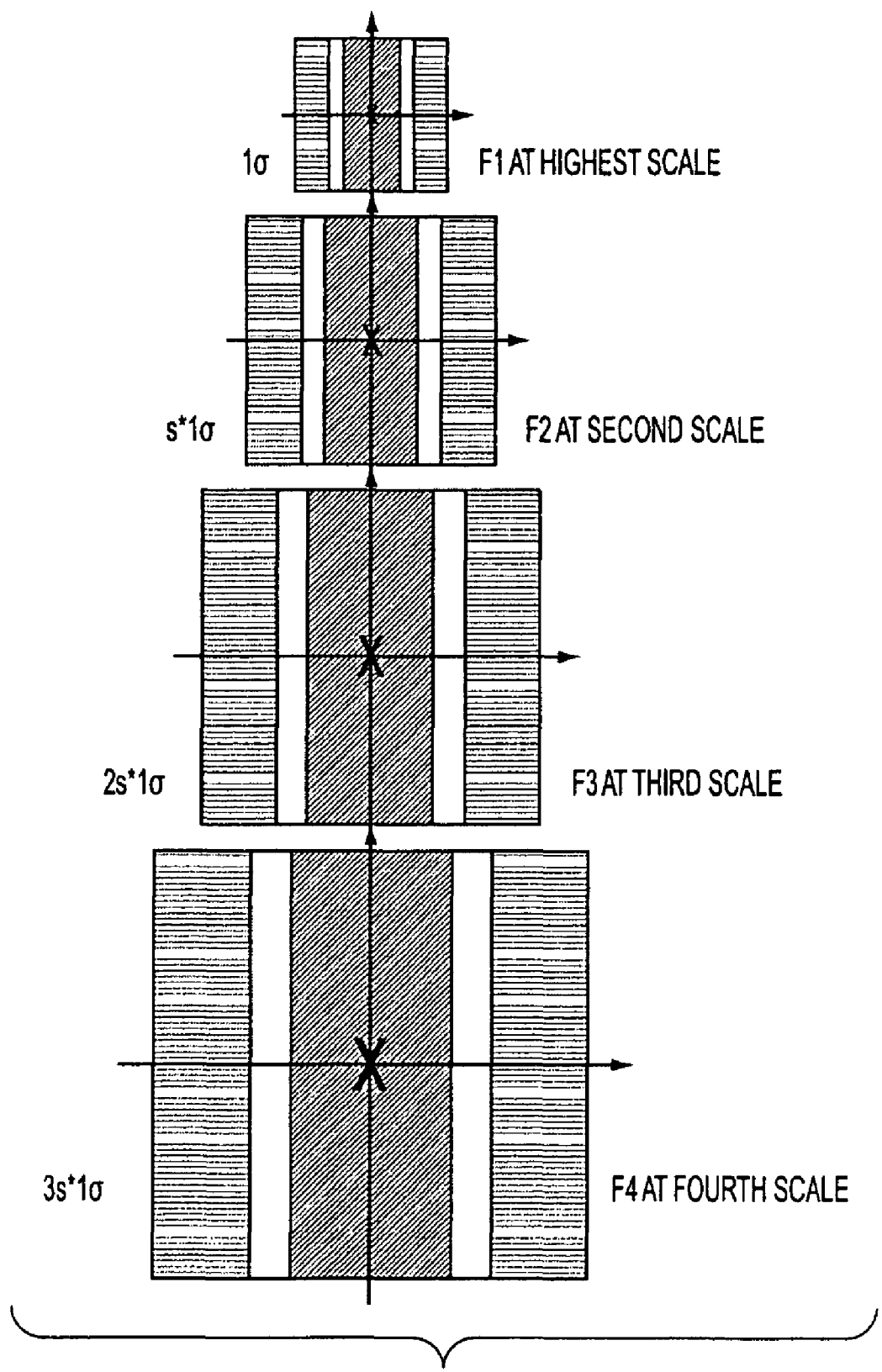
FIG. 9 is an illustration of the set of filters used for building the scale space pyramid layers.

The set of horizontal filters used for building a 4-layer octave of the scale space pyramid is illustrated in FIG. 9. Within a given octave, each subsequent filer F1 is further scaled up by a factor of "s" relative to the previous filter F(i−1), or by a total of (s*i) relative the very first filter F1 at the highest scale. Note that only the horizontal filter is shown in FIG. 9. The vertical and diagonal filters are scaled up in exactly the same manner.

In the cascaded filter approach of the SIFT method, after the keypoint locations are identified for the first octave, the resulting images are again down sampled and filtered, adjacent filter output subtracted, and the result is used for detecting additional keypoint locations at higher scales. This process repeats for each additional scale.

However, in the present system and method, instead of down sampling the filtered image, here each of the basic F1-F3 filter sizes are doubled and the scale space layers are again computed, whereafter any new stable keypoints at the higher scale are identified. Since the filter shapes F1-F3 are fully known in advance, all the scaled up versions of F1-F3 can be computed in advance and stored in memory, such as, but not limited to memories such as included in the components of FIG. 1. Thus the present system and method is ideally suited for parallel and\or multi-threaded processing, in that it enables to separately identify keypoint locations simultaneously in parallel.

The process of doubling the filter sizes for each octave repeats as many times as necessary. Note again that in contrast to the SIFT method, the input image to the filters at any scale is always the same, namely, the original input image.

The above description changes the filter's size by doubling the filters. It is however to be understood, a set of filters can be designed for any ratio. It's only a matter of interpolation between pixels on successive lines.

Take a proposed 1.5× ratio, for example, and starting with a 3×3 smallest-size horizontal filter (one center line and two outer regions of opposite polarity, no "guard band"). Then, successively multiplying by 1.5, 3 becomes 4.5, 6.75, 10.125, etc. So the second filter is 4.5×4.5 in size, made up of 3 horizontal regions of 1.5 lines height each (by scaling).

Divide the 4.5 filter height in half, and the center region will include 0.75 lines on either side of this dividing line. The center region is therefore computed from the sum of pixel values in both lines on either side of the division times 0.75.

Likewise, the outer region is calculated by the sum of:
(a) 0.25 times the sum of pixel values in both immediate lines on either side of the division, plus
(b) the sum of pixel values one line away on either side of the division, plus
(c) 0.25 times the sum of pixel values two lines away on either side of the division.

Subsequent larger filters would be obtained in a similar manner.

As can be seen, shared image pixels on a boundary are simply linearly weighted (i.e., interpolated) by their distance to the boundary line between regions So the described can be extended to any ratio, except that non-integer ratios require a bit of additional interpolation and rounding.

I.4 Identification of Stable Keypoint Locations in Scale Space

An objective of the present application is to identify stable keypoints in an image that can be reliably found with high probability in a target noisy (i.e., downgraded) version of a target image.

In contrast to the SIFT method that is based on the DoG function, the presently described approach is based on detecting "blob-like" and "junction-like" image features. The requirement is that these "blob" and "junction" features can be reliably found in a noisy version of the target image, and that these features are robust to variations in scene illumination, and the like, and also possess certain invariance properties relative to the image (i.e., that they can be found with high probability even in a scaled and rotated version of the image.

As indicated in section I.2 above, the horizontal filter of the present system and method will tend to produce a high magnitude signal for horizontal "elongated" image features of a size corresponding to the filter size at the current scale. Such features are well localizable in the horizontal direction, but not necessarily in the vertical direction. Likewise, the vertical filter will produce a strong magnitude signal for localizable features in the vertical direction. By combining the two responses together, it is possible to identify "blob-like" feature locations in the image that can be localized in both the horizontal and vertical directions.

Similarly, the diagonal filter will act to produce high magnitude signals at the output for diagonal "corner" or "junction-like" image features of a size corresponding to the diagonal filter size at the current scale. Such features will also be well localizable in the diagonal direction. Examples of this type include the junction point between four adjacent squares of alternating checkerboard black-white/white-black pattern or vice versa, or any 90-degree dark or light corners. Of course, other locations in images may be determined as junction points.

Instead of seeking to find the two feature types, i.e., "blob-like" and "junction-like" image features, separately in different filter outputs, in this embodiment the two feature types are combined into a single feature measure:

$$D(x,y,s) = F_H(x,y,s) * F_V(x,y,s) - [k * F_D(x,y,s)]^2,$$

where $F_H(x,y,s)$, $F_V(x,y,s)$, and $F_D(x,y,s)$ are the horizontal, vertical, and diagonal filter outputs, respectively, as shown in FIGS. 4A-4C, and $k^2$ is a normalization parameter between the two feature types due to the possibly of having different filter shapes and the conversion to discrete values on integer pixel boundaries.

For the "blob-like" image features, the signal magnitude at the output of the diagonal filter is likely to be small while the magnitude at the output of the horizontal and vertical filter is large. Likewise, for the "junction-like" image features, the output of either the horizontal or the vertical filter is likely to be small while the magnitude at the output of the diagonal filter is large. Thus the two feature types can be combined together into a single goal of maximizing the magnitude of the output of D (x,y,s), i.e., seeking the extremum either maximum or minimum points of D (x,y,s). The keypoint locations are therefore identified as the locations in the image where the function D (x,y,s) attains its extremum points in both scale s and space (x,y).

Figure 10:
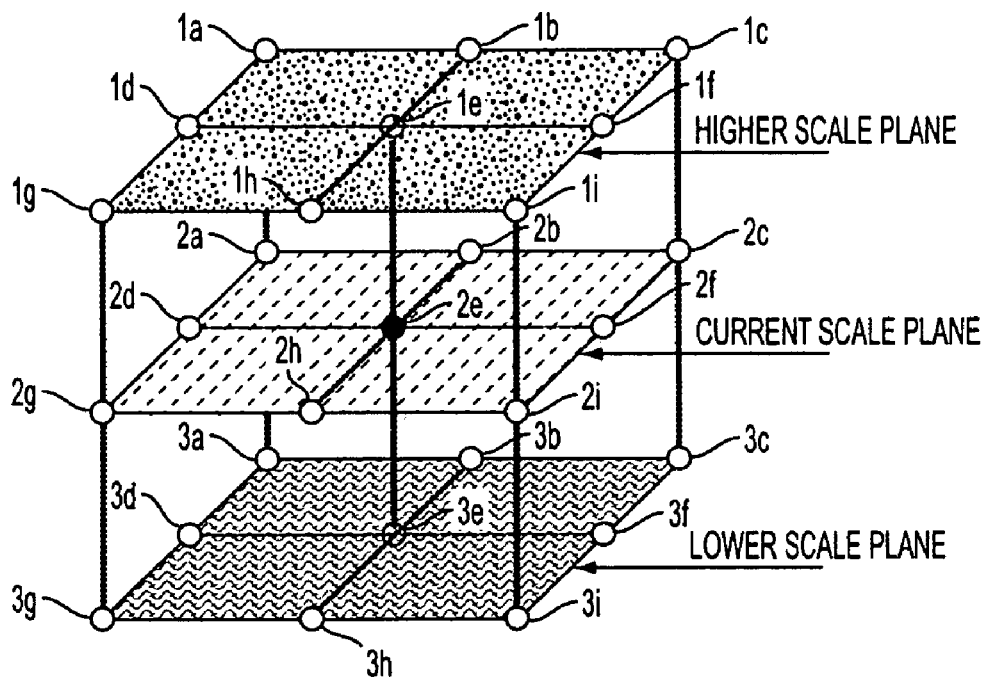
FIG. 10 is an illustration of the method of searching for extremum points of D(x,y,s) in a scale space domain.

The method of searching for the extremum points in scale space domain is illustrated in FIG. 10. The difference function D(x,y,s) is calculated across the entire scale space. A pixel location (2e) in (x,y,s) is determined to be a candidate keypoint location if the value of the function D(x,y,s) is at a peak either maximum or minimum relative to its immediate neighbors as shown in FIG. 10.

The number of stable scale-invariant keypoint locations that can be identified in an image varies considerably depending on the image content and the desired keypoint strength defined below. The final number of keypoints may vary from a few hundreds to thousands in a given typical natural scene image. Thus the majority of image pixels are not candidate keypoint locations. Therefore, for performance reasons, it is desirable to seek a method that could quickly rule out a pixel position as a candidate keypoint location when the particular pixel is not a valid keypoint location. Obviously, it would be desirable to do so as fast as possible, without actually having to check all the neighboring pixels around each pixel position.

Figure 11:
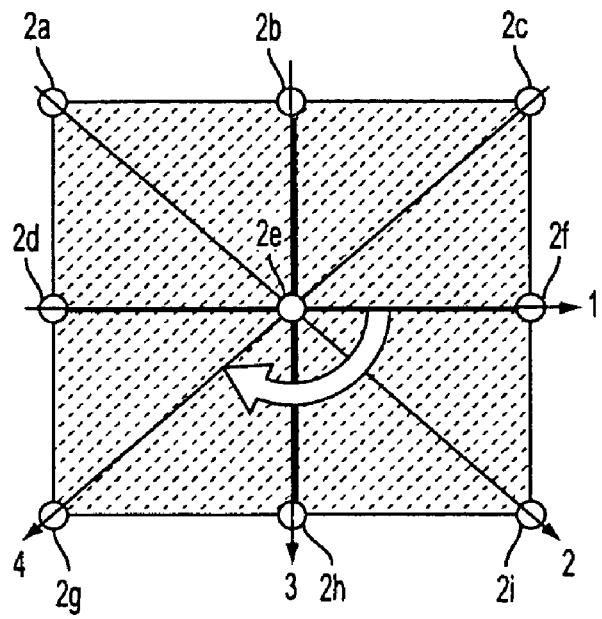
FIG. 11 is an illustration of pairwise pixel testing in a current layer scale.

An approach in the present application to solving this problem is based on an ordered set of triple-pixel comparison tests. The method is rule-based. In each test, a pair of opposing pixels on each side of the center pixel is examined. The method starts by examining the spatial pixel neighborhood (x,y) plane at the current filter scale. The neighborhood includes the nine pixels on the middle plane in FIG. 10 (all starting with the digit 2). A magnified view of this neighborhood is illustrated in FIG. 11. The objective of the method is to determine if the center pixel position (2e) could be a candidate keypoint location.

The first rule of the method is to check if the previous pixel position (2d) in FIG. 11 was identified as a keypoint location. If that is the case, the value of the function $D(x,y,s)$ at the location (2d) must be a maximum or minimum relative to its neighbors. Therefore $D(x,y,s)$ cannot be a peak (i.e., a keypoint) one pixel apart, at a location (2e) as well, in which case the testing for (2e) is concluded and the process can move on to the next pixel.

If, however, the previous pixel location (2d) was not a keypoint, the method retrieves the values of $D(x,y,s)$ at the opposing pixel pair locations (2d) and (2f) on either side of (2e). The value of $D(x,y,s)$ at the center pixel (2e) must be larger than either (2d) and (2f) in case of a maximum or smaller than (2d) and (2f) (in case of a minimum)—for (2e) to qualify as a local extremum point of $D(x,y,s)$ along the direction 1 in FIG. 11.

A threshold "T" is further introduced in order to eliminate the likelihood of occasionally identifying random weak keypoint locations due to the presence of noise and\or small rounding errors in $D(x,y,s)$ from one pixel to the next. The threshold is defined as follows:

$$|D(x,y,s)-D_{(2e)}(x,y,s)|>T \text{ for all neighbor } x,y,s$$

That is, the value of $D(x,y,s)$ at the center pixel location must be larger or smaller by at least T from any other value of $D(x,y,s)$ at any of its pixel neighbor locations. The value of threshold T determines the number of keypoints that can be identified.

When T is large, only the strongest keypoint locations with the strongest peak magnitude value $D(x,y,s)$ will be identified. As the value of T is reduced, additional keypoints at weaker peak magnitude may be identified. The value of T can thus be used to control the desired number of keypoints and the resulting strength of identified keypoints.

In one embodiment of the present application, the value of T is a constant value that is predetermined in advance based on the expected type of images and the desired number of keypoints and their relative strength.

In another embodiment of the present application, the value of T is composed of the sum of a fixed constant part that determines the minimum keypoint strength as indicated above and a dynamically variable part that is based on the average variation of $D(x,y,s)$ magnitude in a local region around the current pixel location of interest. The dynamic adjustment of T can be used to control the number of keypoints identified in a busy image area relative to other more quite image areas.

In a third embodiment of the present application, the magnitude difference between the $D(x,y,s)$ values of the opposing pairwise pixels and the center $D(x,y,s)$ value at (2e) is accumulated over pixel pairs and normalized in order to provide a measure of the keypoint strength. The keypoint strength can later be used for eliminating weaker, less stable keypoints, and for sorting keypoints in accordance with their strength.

Continuing with FIG. 11, if the center $D(x,y,s)$ value at (2e) does not satisfy all the necessary conditions to be a peak value with respect to the opposing neighboring locations (2d) and (2f), it can again be concluded that (2e) cannot be a keypoint location and the process can move on to the next pixel location.

Otherwise, if the center location (2e) can still be a keypoint location, the method retrieves the values of $D(x,y,s)$ of the next opposing pair of pixel locations (2a) and (2i) on either side of (2e) along direction 2 in FIG. 11. The method repeats the analysis above to determine if the center location (2e) can still be identified as a keypoint location. This pairwise pixel comparison test continues in a circle around the center location (2e) for the remaining pixel pairs directions 3 and 4 as shown in FIG. 11.

Note that the method is designed to terminate upon the first occurrence of a pixel pair that fails to still identify the center location (2e) as a candidate keypoint location. The search will often terminate quickly, after a just few of these pairwise pixel tests without spending any more time on additional tests. However, in this embodiment a pixel location will only be identified as a stable keypoint location after all the possible pairwise tests and any other additional rules have all been fully met.

In another embodiment, not all possible pairwise tests may need to be made. For example, in order to reduce the number of computations, some of the pairwise tests can be eliminated (e.g., from far corners 1a, 1c, 1g, 1i in FIG. 12). By using only 1-pixel away neighbors, this reduces the number of tests from 9 to 5 in this case (in between scales). So not all possible pairwise tests are used in this embodiment.

Examples of the mentioned additional rules are expanded on in the following paragraphs. Additionally, such additional rules are also applicable to the present same-scale case, e.g., looking at further opposing pixel pairs that are more than 1-pixel apart, or by checking if both have the same sign on either side of the center pixel. For example, one pixel to the left of 2a and one pixel to the right of 2i will provide a new test at a new direction that is in between 1 and 2 in FIG. 11, and so on.

Once the testing of the current scale plane is completed four pairwise pixel tests along directions 1-4 in FIG. 11 as outlined above, the method proceeds to check if the center pixel location (2e) can be identified as a keypoint location in terms of the scale.

Figure 12:
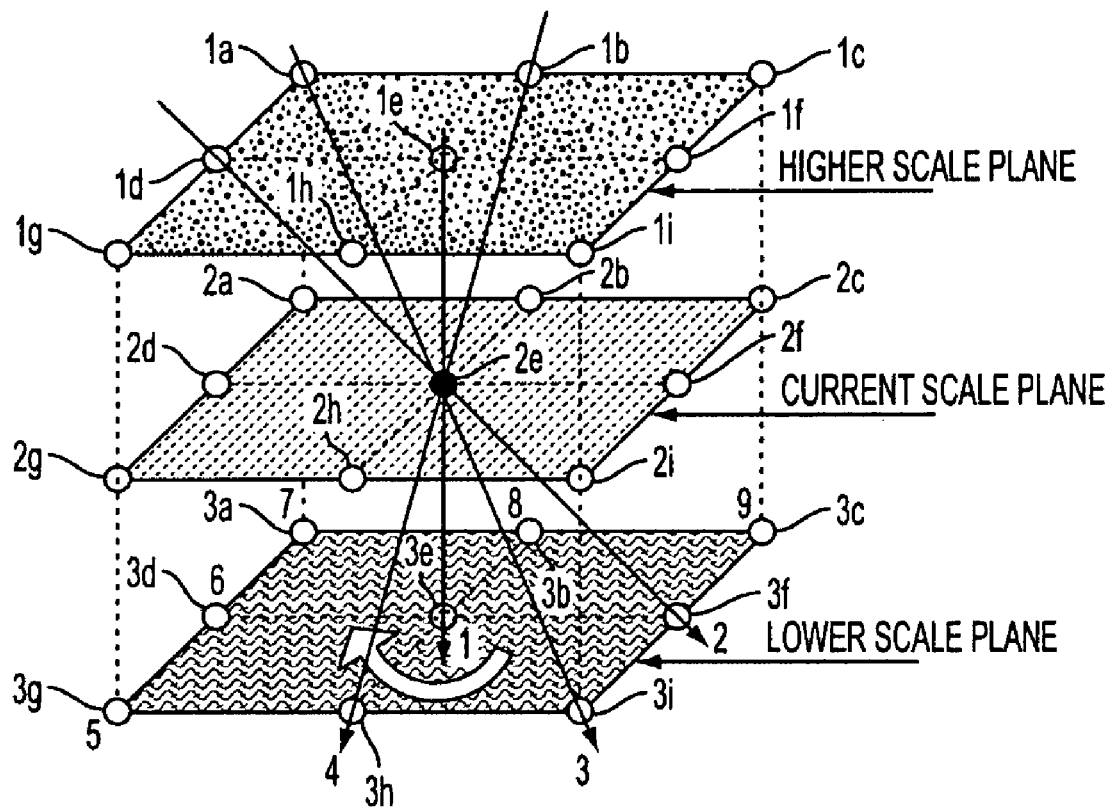
FIG. 12 is an illustration of pairwise pixel testing for candidate peaks between three subsequent layer scales.

Nine additional opposing pairwise tests are applied along the directions 1-9 as shown in FIG. 12. Each pairwise pixel test is essentially the same as described above including the keypoint strength threshold T. However, in contrast to the previous case of four pairwise tests in which all pixel locations were at the same current scale, this time the opposing pixel locations are always selected from different scales, one from a one lower and one from a one higher scale than the current scale. This is done to ensure that the center location (2e) is indeed a true scale space peak of $D(x,y,s)$ in all possible directions.

Once again the method is set to terminate upon the first failure of any of the aforementioned pairwise pixel tests.

In other embodiments of the present application, additional pairwise rules may be added to place further restrictions on the resulting keypoints that can be identified. For example, additional restrictions on the sign consistency of D(x,y,s), or by adding pairs of further away opposing pixels on the one lower scale and one higher plane to provide additional directional tests at more angles, etc.

Figure 13A:
Figure 13B:
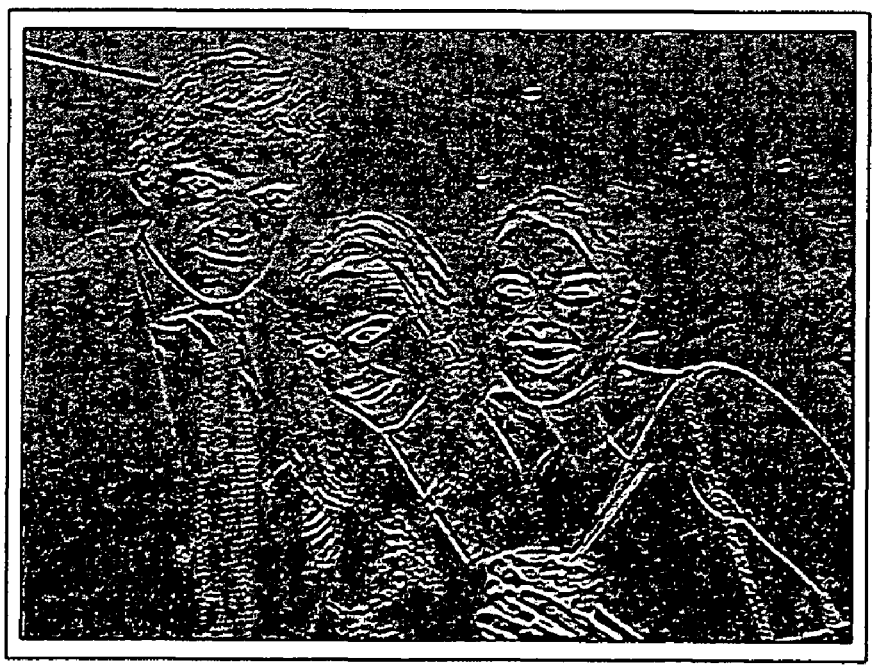
Figure 13C:
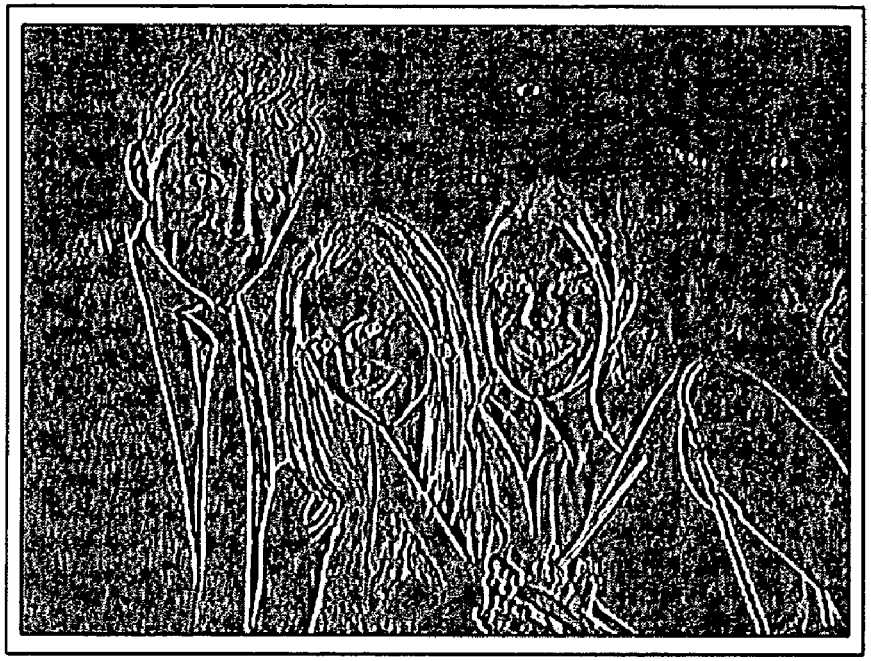
Figure 13D:
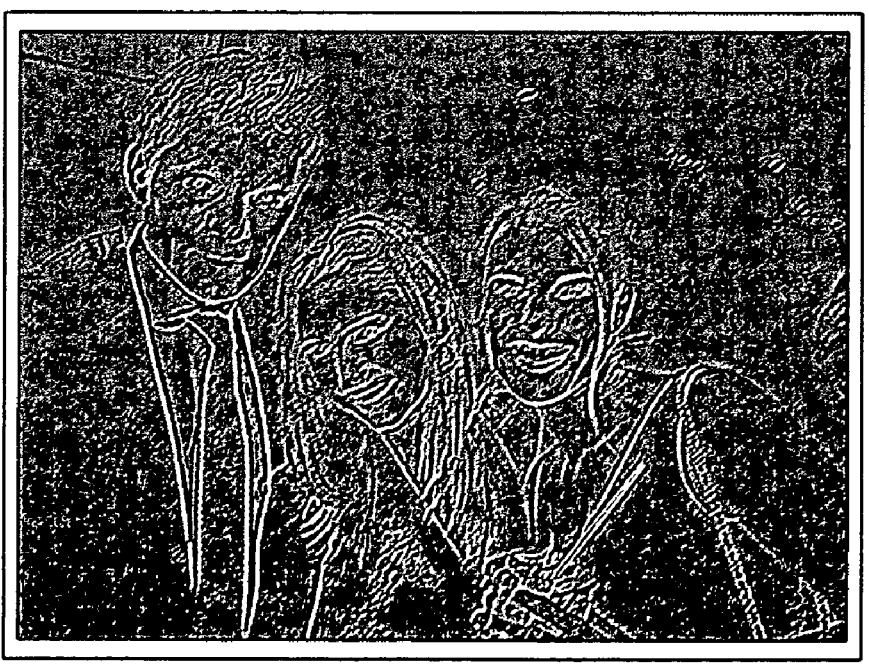
Figure 13E:

FIGS. 13A-13E illustrate the results of keypoint identification procedures performed in accordance with the present application. More particularly, an input image is shown in FIG. 13A. FIG. 13B is an output generated by a horizontal filter, FIG. 13C is an output generated by a vertical filter, and FIG. 13D is an output generated by a diagonal filter, all at a same particular scale. Finally, FIG. 13E shows an output when all three filters are combined.

The input image in FIG. 13A may be an original image converted to a grayscale image. Then a set of different size filters are applied to the grayscale image to build the scale space pyramid layers as illustrated in FIG. 9. The typical output of the horizontal, vertical, and diagonal filter at one particular scale is shown in FIGS. 13B, 13C and 13D, respectively. The three filter outputs are combined together to form the function D(x,y,s) in at least three subsequent scales. Finally, the output of one of the three scales, the current scale, is shown in FIG. 13E. The pixel locations at which D(x,y,s) attains an extremum in scale space relative to all its neighbors are indentified as stable keypoint locations for the current scale space pyramid layer.

Additional keypoints may be extracted from higher pyramid layers.

FIG. 14 illustrates the process of identifying additional keypoints (designated by the circles) in higher pyramid layers. For reference, FIG. 15 illustrates the "equivalent" DoG image pyramid after taking into account the corresponding reduction in image size due to the doubling of filter sizes at each pyramid layer. Note that FIG. 15 is provided for reference only and should not to be confused as part of the proposed method implementation.

The proposed method of the present application is significantly faster to compute than any of the existing methods such as SIFT, yet it appears to be just as effective in identifying stable keypoints in an image.

SUMMARY

The present following paragraphs summarize some aspects of the present application which have been described above.

Gaussian filters are replaced with much simpler Haar-like feature saliency indicator rectangular filters that can be computed very fast and require far fewer computations relative to the existing methods. Unlike many of the existing schemes, Gaussian filtering is not directly employed in the presently described multi-scale analysis. Gaussian filtering has been determined to be desirable for space-scale analysis due to their excellent smoothing properties. However, in practice, the Gaussian shape is not ideal in that it has to be approximated by digitizing into discrete values and in addition cutting off the otherwise infinite tail beyond a certain point. Furthermore, even with accurate Gaussian filtering, aliasing artifacts can still be introduced when the images are down-sampled. Some of the highly regarded techniques have demonstrated remarkable results even under further approximations of the Gaussian shapes (for example, D. Lowe's approximation of the Laplacian-of-Gaussian (LoG) image pyramid as a Difference-of-Gaussian (DoG) image pyramid as part of the SIFT method.

The conventional methods of scale-space analysis generally involve an image pyramid, whereby the image is repeatedly smoothed with a Gaussian filter and subsequently down-sampled to obtain the next higher level of the pyramid. This iterative process of Gaussian filtering and down-sampling is rather time consuming. In the present application, we entirely eliminate the need to iteratively apply a Gaussian filter to the output of the previously filtered image to obtain the next filtered image, which, in turn, becomes the next higher pyramid image after down-sampling. Instead, the present system and method can conveniently and efficiently calculate the entire image pyramid by applying different rectangular shape sizes directly on the original image using no recursive filtering. Therefore the present system and method can perform the multi-scale analysis by scaling up the filter size rather than iteratively scaling down the image.

With Gaussian filtering, a wider filter over a larger area and/or scale requires more computations to calculate. The system and method of the present application, in contrast, achieves not only a very fast rate, but the speed is exactly the same for any filter size. With rectangular filter shapes, the properties of the area sum integral to accomplish this are leveraged. First, the area sum for each pixel of the original image relative to a given image corner bottom left is calculated. This can be done effectively, at about one add per pixel, by recursively adding the current pixel value to the previous area sum while keeping track of rows and columns. Once the area sum integral has been calculated for the entire image and stored in memory, the area under any rectangular filter shape can be computed using only two additions for any rectangular filter size, leading to an improvement in performance.

Instead of using Gaussian second order derivatives as in the Hessian-matrix based techniques, for example, the present application seeks to find distinct keypoints that can be localized in two spatial image dimensions space as well as in various scales, otherwise known as a multi-scale analysis. This method uses simple rectangular filter shapes to identify the location of such keypoints. As the present application seeks a set of the most distinctive keypoints in the image, the precise shape of the filter is not definitive. That is, a well localized image keypoint such as a sharp building corner or the corner of an eye is likely to be found just as well with a simpler filter. The present application utilizes filter shapes that are designed to capture image features at the vertical, horizontal, and diagonal directions. The specific filter shapes can be interpreted as a rectangular approximation of the Gaussian shape. Depending on the quality of the input image and anticipated capture device, these filters may additionally contain separation "guard bands" to help eliminate noise and sampling artifacts. The basic filter shapes are scaled up to provide the multi-scale image analysis. However, actual scaling of the filter shapes is not necessary. Due to the rectangular filter shapes, the scaling can be efficiently done by recording the new corner coordinates in advance, and using the image integral to obtain the new different size filter result.

The present system and method is particularly suitable for parallel implementation since each pyramid level can be directly computed from the input image using the area sum as outlined above. The computation for each pyramid level is entirely independent of the other pyramid levels and takes exactly the same time regardless of the filter size. In contrast, the iterative nature of the conventional keypoint detection techniques that utilize a succession of Gaussian filtering and down sampling does not easily lend itself to parallel implementation. Thus the present system and method has the advantage of providing a fully parallel multi-scale analysis scheme.

The present application employs a rule-based method to determine the location of distinct keypoints in the image. A typical image that contains millions of pixels may give rise to several hundreds to thousands of candidate keypoints. Since most image pixels are not keypoints, minimization of the time spent at any given image pixel is sought. The present system and method performs a series of successive tests between pairs of neighboring pixels, etc., on either side of the current pixel of interest at various scales and orientations to quickly determine if the current pixel could be a strong keypoint candidate. The tests are organized by likelihood order. If at each successive test the relationship between the current pixel and its neighbors does not satisfy the required conditions, the method rules out the current location as a keypoint and moves on to the next pixel. Thus the overall time is minimized while each final keypoints meets all the conditions for being a valid keypoint. The present system and method uses a plurality of such rules to determine the likely keypoint candidates.

Also introduced in this application is the notion of a sampling overlap for each subsequent filter position in order to improve the smoothness of the result and lessen the impact of potential discontinuities along filter boundaries. The rectangular filters are normalized to remain constant after scaling. In addition, as the filter size is increased for each higher scale analysis, the sampling positions can also be correspondingly increased to conveniently reduce the effective resolution of higher pyramid layers for keypoint identification.

In addition, also introduced is a measure of keypoint strength for each keypoint candidate. The resulting keypoints can be sorted by strength order to determine the best, most distinctive, keypoints in an image and discard any other weak keypoints not likely to be found in a degraded noisy version of the image. Typically the top few hundreds of the strongest keypoints are the most useful for the purpose of image matching. Thus an improvement in performance can be gained by concentrating on a small subset of the strongest keypoints, and only adding weaker keypoints in case the matching results are inconclusive. Alternatively, the desired number and strength of keypoints can be determined in advance, and the keypoint identification process stopped as soon as a sufficient number of suitable keypoints have been identified, thereby not wasting the time to identify further keypoints. The keypoint strength is calculated on the fly during the sequence of tests using the individual contribution of each test. The keypoint strength measure is particularly useful for certain application-specific processing such as but not limited to, select anchor keypoints in further downstream processing.

The claims can encompass embodiments in hardware, software, or a combination thereof. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of finding stable keypoints in a picture image using localized scale space properties, comprising:
   calculating by at least one processor an integral image of an input image;
   constructing by the at least one processor a scale space pyramid layer representation of the input image at multiple scales, wherein at each scale, a set of specific filters are applied to the input image to produce an approximation of at least a portion of the input image;
   combining by the at least one processor the output of each of the filters together to form a single function of scale and space;
   identifying by the at least one processor stable keypoint locations in each scale as pixel locations at which the single function attains a local peak value; and
   storing by the at least one processor the stable keypoint locations in a memory storage;
   wherein the constructing of the scale space pyramid representation of the input image at multiple scales includes scaling up the filters, wherein each successive filter is a scaled up version of a previous filter.

2. The method according to claim 1, wherein the approximation is a Laplacian of Gaussian (LoG) function.

3. The method according to claim 1, wherein the filters are of a same shape having different sizes.

4. A method of finding stable keypoints in a picture image using localized scale space properties, comprising:
   calculating by at least one processor an integral image of an input image;
   constructing by the at least one processor a scale space pyramid layer representation of the input image at multiple scales, wherein at each scale, a set of specific filters are applied to the input image to produce an approximation of at least a portion of the input image, wherein the constructing step includes a predetermined number of operations regardless of the filter size;
   combining by the at least one processor the output of each of the filters together to form a single function of scale and space;
   identifying by the at least one processor stable keypoint locations in each scale as pixel locations at which the single function attains a local peak value; and
   storing by the at least one processor the stable keypoint locations in a memory storage;
   wherein the predetermined number of operations are addition operations.

5. The method of claim 1, wherein the local peak value is one of a maximum or a minimum.

6. The method of claim 3, wherein the calculating step has a calculation time which is a fixed constant that remains exactly the same regardless of the filter size.

7. The method according to claim 1, wherein the constructing of a particular scale space pyramid layer is decoupled from constructing other scale space pyramid layers.

8. The method according to claim 1, which performing the constructing includes constructing multiple space pyramid layers, wherein at least some of the multiple space pyramid layers in parallel.

9. The method according to claim 8, wherein the constructing of at least some of the multiple space pyramid layers is divided among one of multiple processors or threads.

10. The method of claim 1, wherein for higher pyramid octaves with larger filters at higher scales, a distance between subsequent filter positions is proportionally increased in order to reduce the computational load.

11. The method of claim 1, further including displaying the identified stable keypoint locations on an electronic display.

12. A method of finding stable keypoints in a picture image using localized scale space properties, comprising:
   calculating by at least one processor an integral image of an input image;
   constructing by the at least one processor a scale space pyramid layer representation of the input image at multiple scales, wherein at each scale, a set of specific filters are applied to the input image to produce an approximation of at least a portion of the input image;

combining by the at least one processor the output of each of the filters together to for single function of scale and space, identifying by the at least one processor stable keypoint locations in each scale as pixel locations at which the single function attains a local peak value; and storing by the at least one processor the stable keypoint locations in a memory storage;

wherein the filters are configured with a first region, wherein all pixel values in the first on assume a first polarity and a second region, wherein all pixel values in the second region assume a second polarity different from the first polarity;

wherein the filters further include a guard band located along a boundary between the first region and the second region, separating the first region and the second region, and wherein all pixels values in the guard band assume a value of zero.

13. The method according to claim 1, wherein the filters are moved from an initial location on the input image to subsequent locations, and the moving to the subsequent locations result in a partial overlapping of an immediately preceding location.

14. An electronic data processing system, including at least one processor capable of processing software operations stored in a memory of the electronic data processing system, wherein the processing operations comprise:

calculating an integral image of an input image;

constructing a scale space pyramid layer representation of the input image at multiple scales, wherein at each scale, a set of specific filters are applied to the input image to produce an approximation of at least a portion of the input image;

combining the output of each of the filters together to form a single function of scale and space;

identifying stable keypoint locations in each scale as pixel locations at which the single function attains a local peak value; and storing the stable keypoint locations in a memory storage;

wherein the constructing of the scale space pyramid representation of the input image at multiple scales includes scaling up the filters, wherein each successive filter is a scaled up version of a previous filter.

15. The system of claim 14, wherein the approximation is a Laplacian of Gaussian (LoG) function.

16. The system of claim 14, wherein the filters are rectangular filters of different sizes.

17. The system of claim 14, wherein the constructing of the scale space pyramid representation of the input image at multiple scales includes scaling up the filters, wherein each successive filter is a scaled up version of a previous filter.

18. The system of claim 14, wherein the constructing includes a predetermined number of operations regardless of the filter size.

19. The system of claim 14, wherein the local peak value is one of a maximum or a minimum.

20. The method of claim 1, wherein the shaped filters of different sizes are one of rectangular, parallelogram, and trapezoidal shaped filters.

21. The method of claim 1, wherein each filter is independent of all other filters at any scale and can be simultaneously computed in parallel using the same number of operations per filter regardless of scale or filter type.

22. The method of claim 1, wherein the set of specific filters includes independent horizontal, vertical and diagonal filters.

23. The method of claim 1, further comprising:

concatenating outputs of all scales together to form a scale and space pyramid representation, the scale outputs corresponding to pyramid layers.

* * * * *